United States Patent [19]
Fults et al.

[11] Patent Number: 5,327,529
[45] Date of Patent: Jul. 5, 1994

[54] PROCESS OF DESIGNING USER'S INTERFACES FOR APPLICATION PROGRAMS

[75] Inventors: Douglas A. Fults, San Leandro; Anthony M. Requist, Alameda, both of Calif.

[73] Assignee: Geoworks, Berkeley, Calif.

[21] Appl. No.: 942,354

[22] Filed: Sep. 9, 1992

Related U.S. Application Data

[63] Continuation of Ser. No. 681,079, Apr. 5, 1991, abandoned, which is a continuation-in-part of Ser. No. 586,861, Sep. 24, 1990, abandoned.

[51] Int. Cl.$^5$ ............................ G06F 3/14; G06F 9/45
[52] U.S. Cl. ..................................... 395/155; 395/700
[58] Field of Search ............... 395/155, 160, 156, 159, 395/157, 700 MS, 650 MS

[56] References Cited

U.S. PATENT DOCUMENTS

| | | | |
|---|---|---|---|
| 4,692,858 | 9/1987 | Redford et al. | 395/157 |
| 4,782,463 | 11/1988 | Sanders et al. | 395/70 |
| 4,811,240 | 3/1989 | Ballou et al. | 395/155 |
| 4,866,638 | 9/1989 | Cosentino et al. | 395/159 |
| 5,179,657 | 1/1993 | Dykstal et al. | 395/155 X |
| 5,021,976 | 6/1991 | Wexelblat et al. | 395/159 |
| 5,041,992 | 8/1991 | Cunningham et al. | 395/155 X |
| 5,115,501 | 5/1992 | Kerr | 395/700 X |
| 5,119,475 | 6/1992 | Smith et al. | 395/156 |
| 5,121,477 | 6/1992 | Koopmans et al. | 395/156 |
| 5,179,700 | 1/1993 | Aihara et al. | 395/650 |

OTHER PUBLICATIONS

"Making the Same Look Different"-ORACLE 1990 (Advertisement).
"Automatic, Look-And-Feel Independent Dialog Creation For Graphical User Interfaces", Brad Vander Zanden and Brad A. Myers; School of Computer Science, Carnegie Mellon University, CHI '90 Proceedings-Apr. 1990, pp. 27-34.
"Neuron Data Open Interface" Technical Overview The Tool for Building Portable Graphical User Interfaces Across All Windowing Standards-Neuron Data Inc., May 1991.

*Primary Examiner*—Raymond J. Bayerl
*Attorney, Agent, or Firm*—Wilson, Sonsini, Goodrich & Rosati

[57] ABSTRACT

A method for invoking a user interface for use with an application operating in a computer system which involves providing in the computer system a generic object class that corresponds to a class of function that is to be performed using the user interface; specifying in the application instance data in the form of a generic object specification that corresponds to the generic object class, the instance data including attribute criteria and hint criteria; providing in the computer system at least one specific user interface toolbox and controller that operates in the computer system to provide a selection of possible specific user interface implementations for use in performing the class of function; and providing in the computer system at least one interpreter that corresponds to the at least one specific user interface toolbox and controller.

11 Claims, 24 Drawing Sheets

FIG.−1

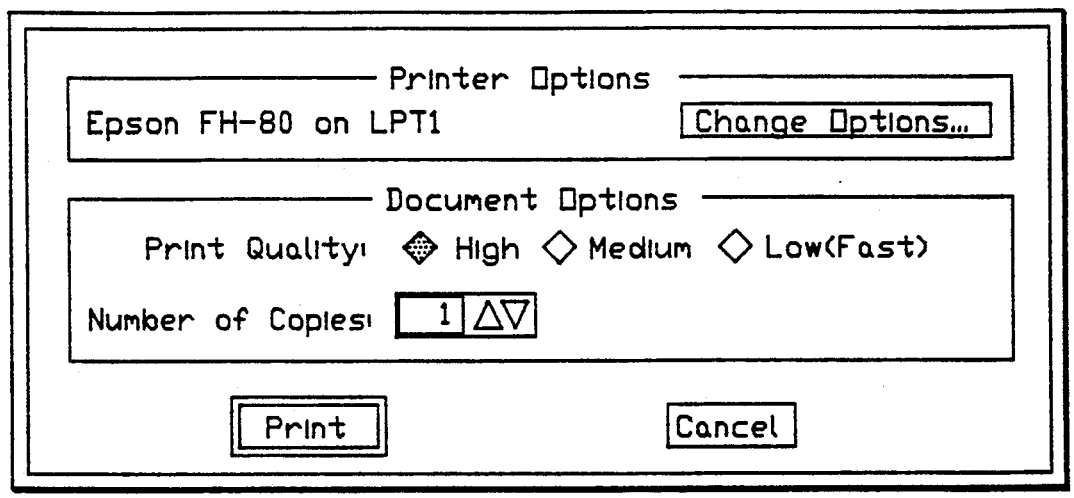
FIG.—3
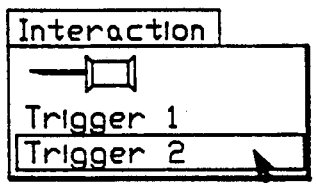
FIG.—4
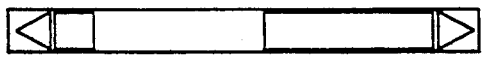
FIG.—6
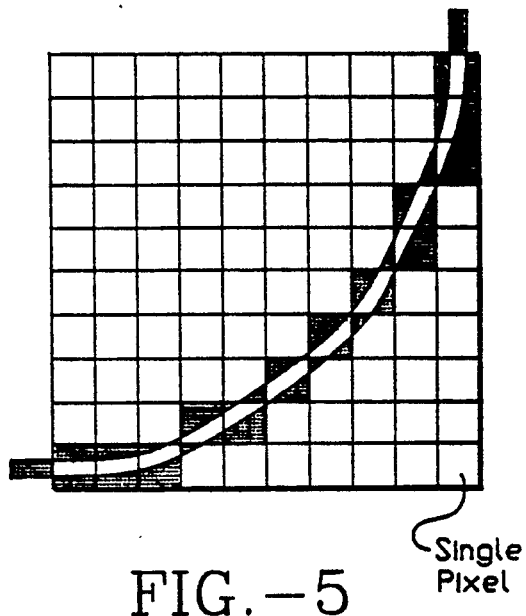
FIG.—5
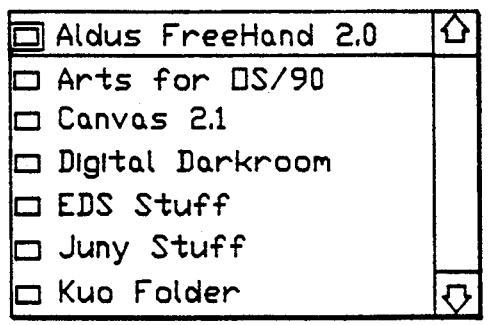
FIG.—7
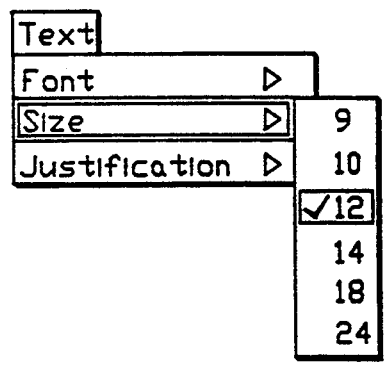
FIG.—8

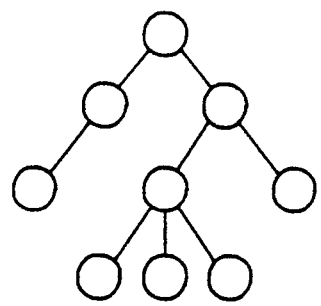
FIG.−9
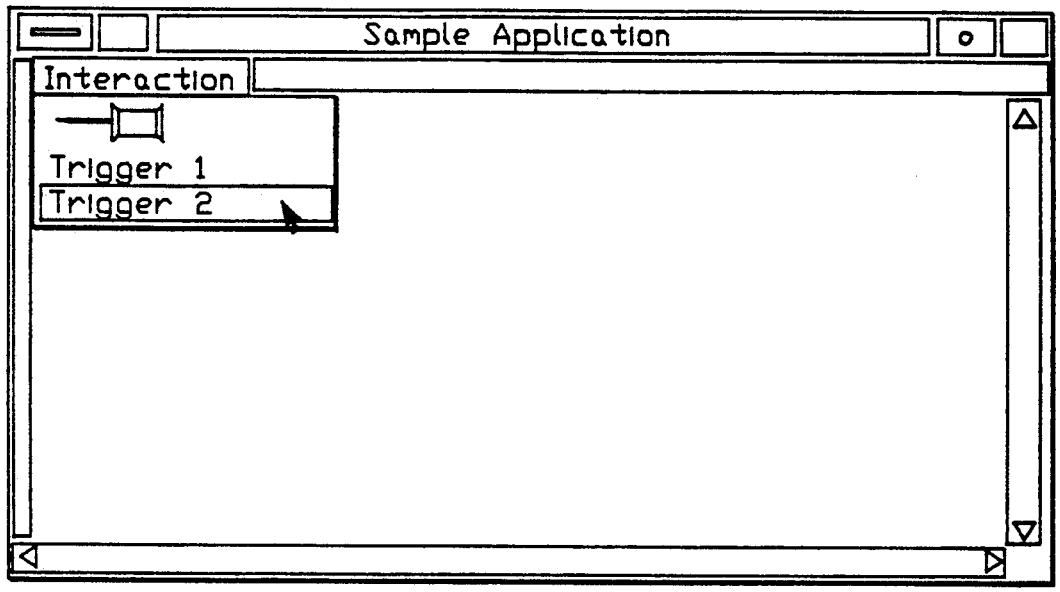
FIG.−10
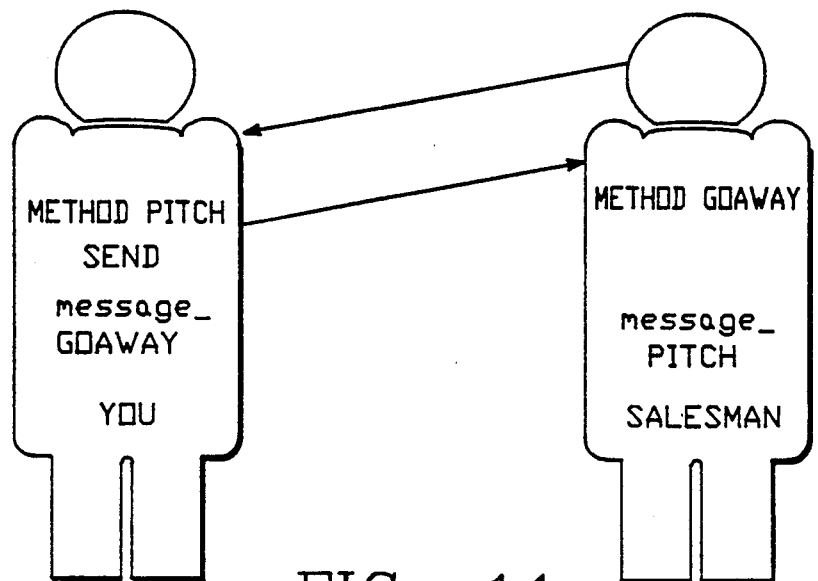
FIG.−11

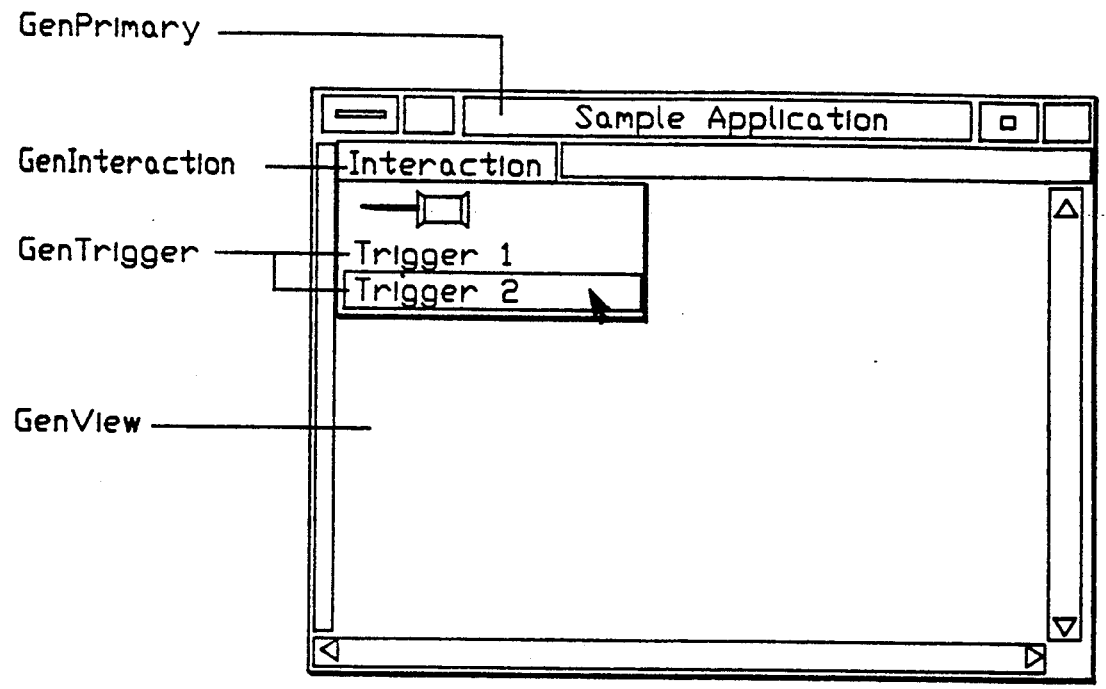
FIG.—14
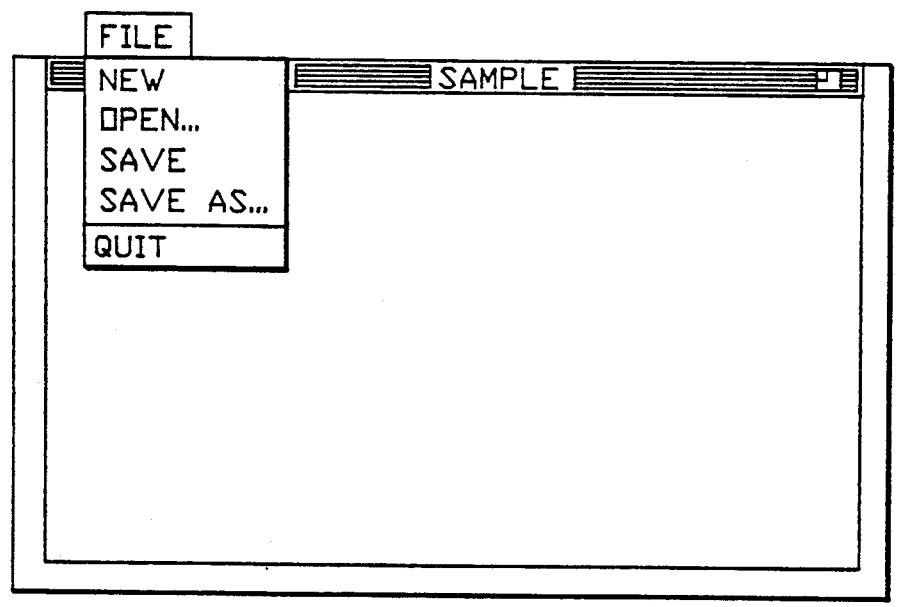
FIG.—15

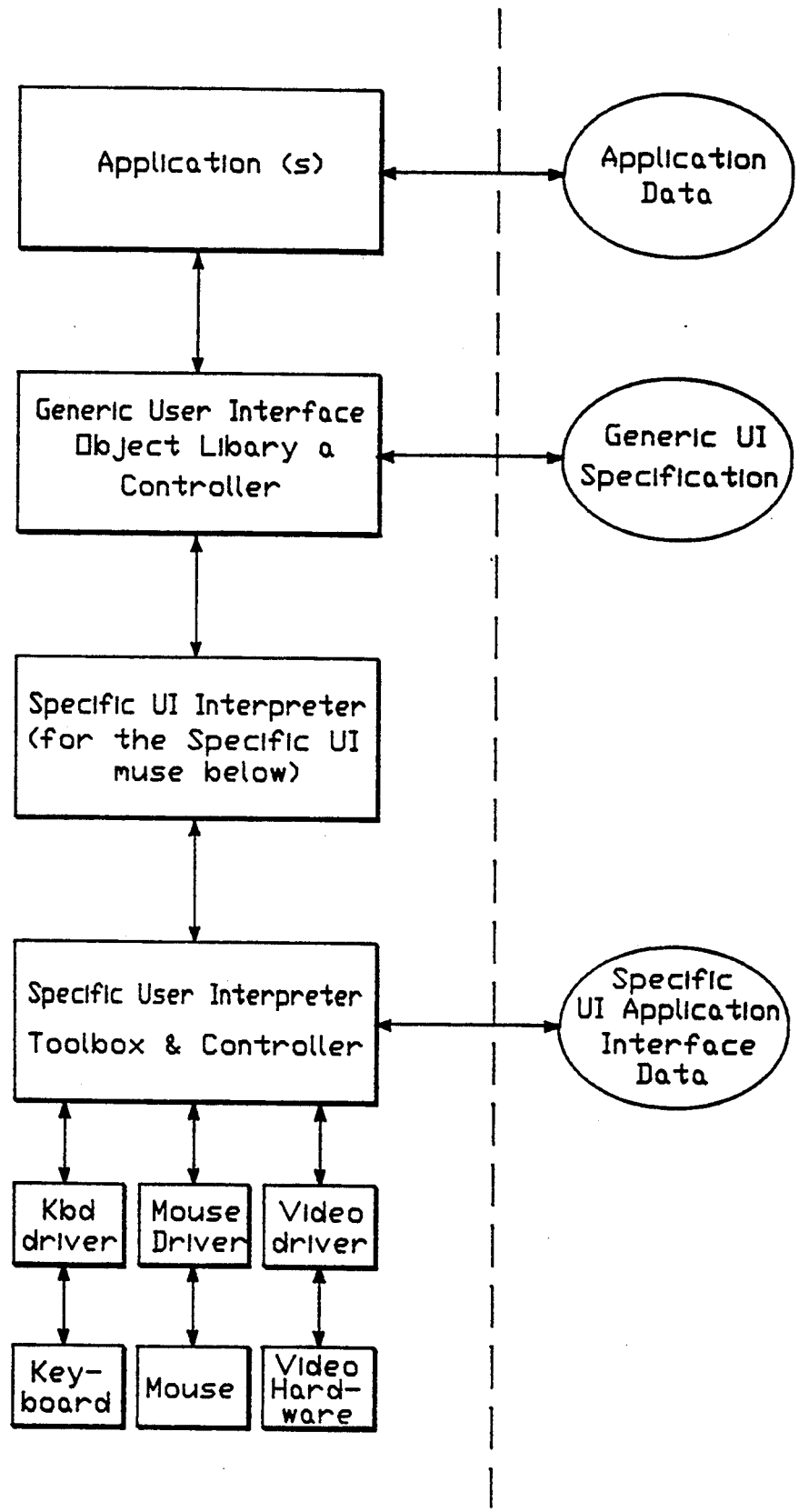
FIG.—21

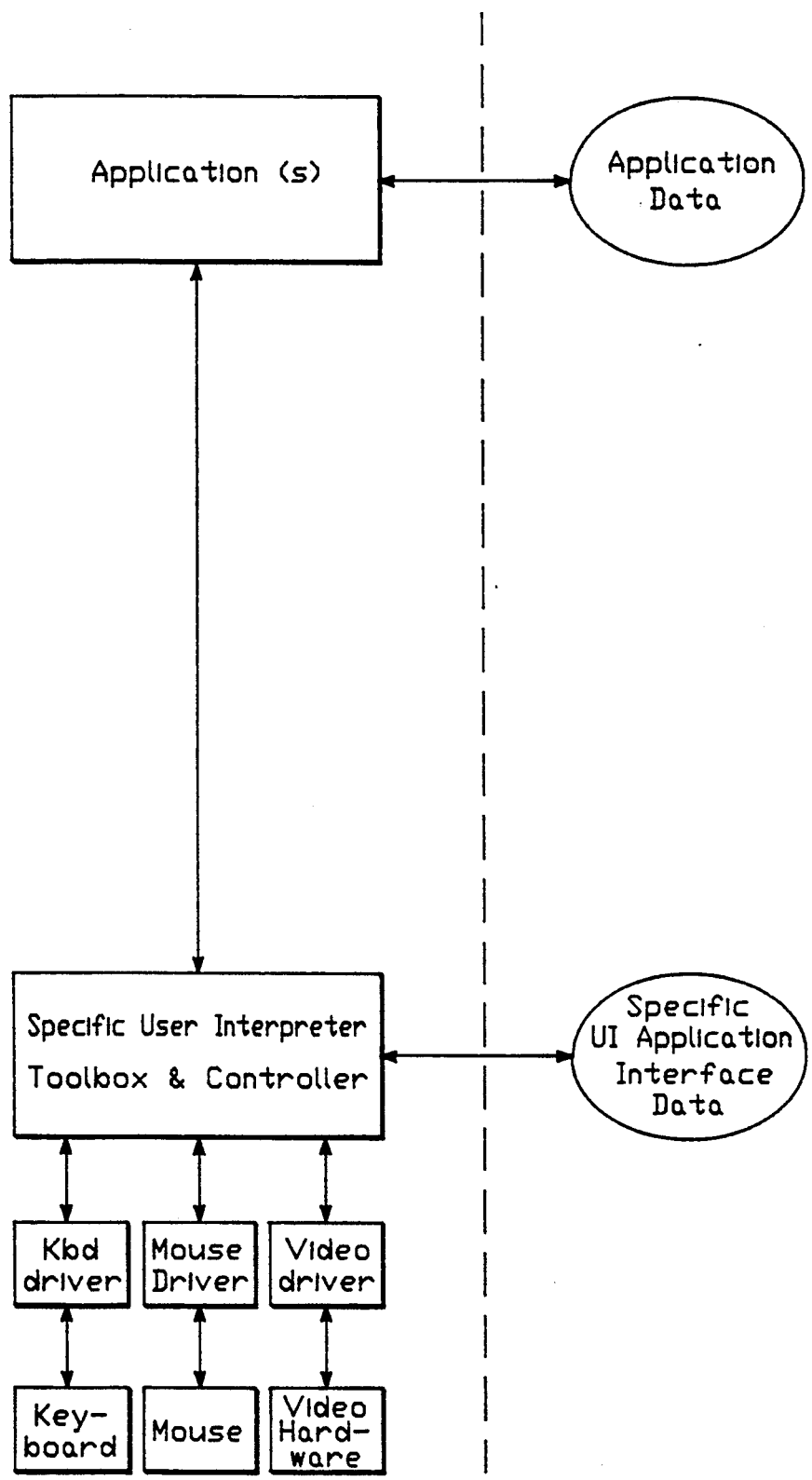
FIG.—22
(Prior Art)

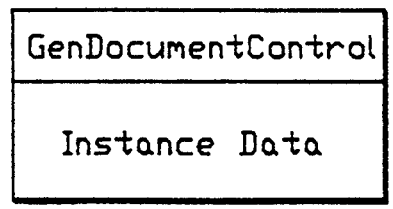
FIG.—23
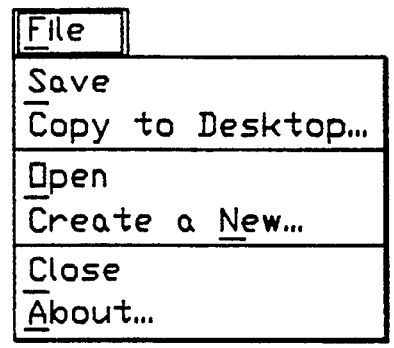
FIG.—24
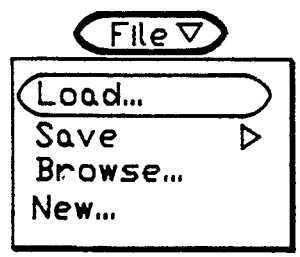
FIG.—25
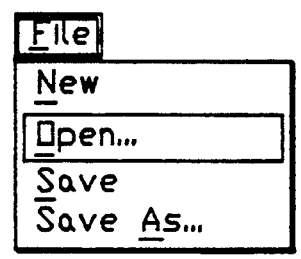
FIG.—26

```
GenList
Attributes                        Hints
  int        numItems             HINT_INTERPRET_BASED_ON(X)ITEMS
  boolean    dynamic              HINT_RECOMMEND_POPUP_LIST
  monikerType moniker             HINT_RECOMMEND_RADIO_BUTTONS
                                  HINT_RECOMMEND_SCROLLING_LIST
                                  HINT_SHOW_ALL_OPTIONS
                                  HINT_SHOW_CURRENT_SELECTION_ONLY
                                  HINT_SHOW_ITEM_BITMAPS
                                  HINT_USE_MAXIMAL_SCREEN_SPACE
                                  HINT_USE_MINIMAL_SCREEN_SPACE
```
FIG.-27
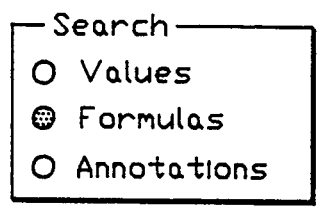
FIG.-28
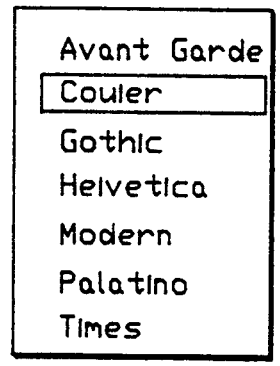
FIG.-30
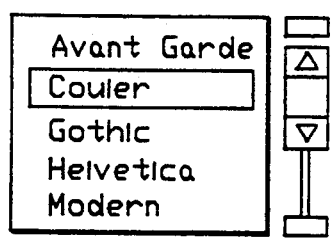
FIG.-29

| Possible Gadget Choices | Example | Style Guide Interpretation Rule |
|---|---|---|
| Abbreviated Menu Button<br>* occupies small amount of screen space<br>* recommended for ≤ 16 items<br>* shows current selection only<br>* shows all options while choosing | Fruit: ▲<br>Fruit: ▲ Apple<br>　Apple<br>　Banana<br>　Kiwi<br>　Necterine<br>　Orange<br>　Pear<br>　Tomato | Abbreviated Menu Button may be use IF<br>(6 ≤ items ≤ 16)<br>OR (items ≤ 16)<br>　AND (HINT_RECOMMEND_POPUP_LIST<br>　　OR HINT_USE_MINIMAL_SCREEN_SPACE<br>　　OR HINT_SHOW_CURRENT_SELECTION_ONLY<br>　　OR (HINT_INTERPET_BASED_ON(X)ITEMS<br>　　　AND 6 ≤ X ≤ 16)<br>　) |
| Exclusive Setting<br>* occupies large amount of screen space<br>* shows all selection options at all times<br>* recommended for 2-5 options, up to 10 | Size: Small Medium Large | Exclusive Setting may be use IF<br>(2 ≤ items ≤ 5)<br>OR (items ≤ 10)<br>　AND (HINT_RECOMMEND_RADIO_BUTTONS<br>　　OR HINT_USE_MAXIMAL_SCREEN_SPACE<br>　　OR HINT_SHOW_ALL_OPTIONS<br>　　OR (HINT_INTERPET_BASED_ON(X)ITEMS<br>　　　AND 2 ≤ X ≤ 5)<br>　) |
| Scrolling List<br>* occupies medium to large amount of screen space<br>* handles any number of items<br>* default of 5 entries showing at a time | Font: Avant Garde<br>　Couler<br>　Gothic<br>　Helvetica<br>　Modern | Scrolling List may be use IF<br>(items ≤ 17)<br>OR dynamic number of items<br>OR HINT_RECOMMEND_SCROLLING_LIST<br>OR (HINT_INTERPET_BASED_ON (X) ITEMS<br>　AND X ≤ 17) |

FIG.-31

| Possible Gadget Choices | Example | Style Guide Interpretation Rule |
|---|---|---|
| Graphical Radio Button<br><br>* occupies large amount of screen space<br>* shows all selection options at all times<br>* shows moniker bitmaps with each option<br>* recommended for 2-5 options, up to 10 | ☐ Small<br>☐ Medium<br>☐ Large | Graphical Radio Button may be use IF (moniker bitmaps available)<br>AND ((2 ≤ items ≤ 5)<br>OR ((items ≤ 10)<br>AND (HINT_RECOMMEND_RADIO_BUTTONS<br>OR HINT_USE_MAXIMAL_SCREEN_SPACE<br>OR HINT_SHOW_ALL_OPTIONS<br>OR HINT_SHOW_ITEM_BITMAP<br>OR (HINT_INTERPET_BASED_ON(X)ITEMS<br>AND 2 ≤ X ≤ 10) |
| Scrolling List<br><br>* occupies medium to large amount of screen space<br>* handles any number of items<br>* default of 10 entries showing at a time | Avant Garde<br>Couler<br>Gothic<br>Helvetica<br>Modern | Scrolling List may be use IF<br>(items ≤ 11)<br>OR dynamic number of items<br>OR HINT_RECOMMEND_SCROLLING_LIST<br>OR (HINT_INTERPET_BASED_ON (X) ITEMS<br>AND X ≤ 11) |

FIG.-32

```
GenList
┌─────────────────────────────────────────┐
│ Moniker = Shape                         │
│ 6 items                                 │
│ not dynamic                             │
│ HINT_USE_MINIMAL_SCREEN_SPACE           │
│ HINT_SHOW_ITEM_BITMAPS                  │
│  ┌───────────────────────────────────┐  │
│  │ GenListEntry                      │  │
│  │ Moniker = Circle          ┌────┐  │  │
│  │ HINT_OPTIONAL_MONIKER_BITMAP ( ○ ) │  │
│  │                          │Circle│  │  │
│  └───────────────────────────────────┘  │
│  ┌───────────────────────────────────┐  │
│  │ GenListEntry                      │  │
│  │ Moniker = Heart          ┌────┐   │  │
│  │ HINT_OPTIONAL_MONIKER_BITMAP ( ♡ )│  │
│  │                          │Heart │  │  │
│  └───────────────────────────────────┘  │
│  ┌───────────────────────────────────┐  │
│  │ GenListEntry                      │  │
│  │ Moniker = Line           ┌────┐   │  │
│  │ HINT_OPTIONAL_MONIKER_BITMAP ( / )│  │
│  │                          │Line  │  │  │
│  └───────────────────────────────────┘  │
│  ┌───────────────────────────────────┐  │
│  │ GenListEntry                      │  │
│  │ Moniker = Oval           ┌────┐   │  │
│  │ HINT_OPTIONAL_MONIKER_BITMAP ( ⬯ )│  │
│  │                          │Oval  │  │  │
│  └───────────────────────────────────┘  │
│  ┌───────────────────────────────────┐  │
│  │ GenListEntry                      │  │
│  │ Moniker = Square         ┌────┐   │  │
│  │ HINT_OPTIONAL_MONIKER_BITMAP ( □ )│  │
│  │                          │Square│  │  │
│  └───────────────────────────────────┘  │
│  ┌───────────────────────────────────┐  │
│  │ GenListEntry                      │  │
│  │ Moniker = Triangle       ┌────┐   │  │
│  │ HINT_OPTIONAL_MONIKER_BITMAP ( △ )│  │
│  │                          │Triang│  │  │
│  └───────────────────────────────────┘  │
└─────────────────────────────────────────┘
```

| Circle |
|--------|
| Heart |
| Line |
| Oval |
| Square |
| Triangle |

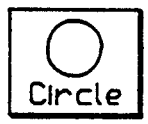  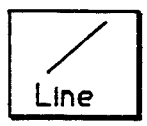 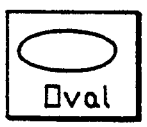 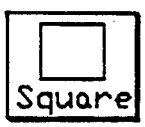 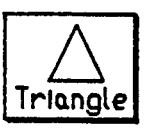

FIG.—33

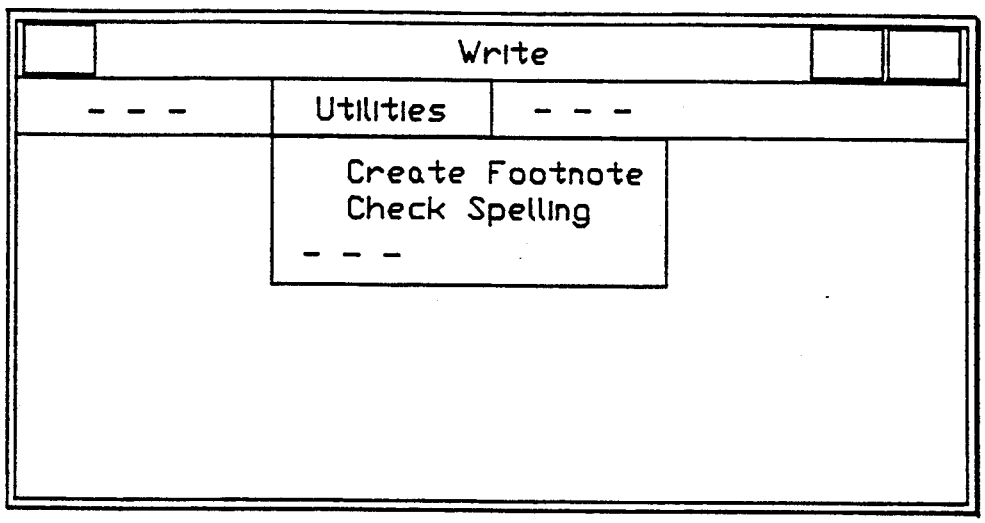
FIG.—35
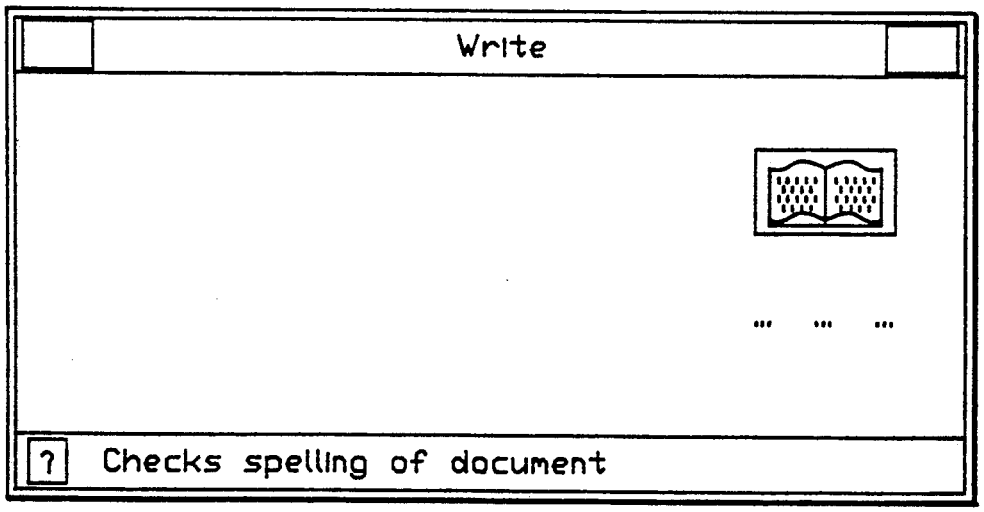
FIG.—36

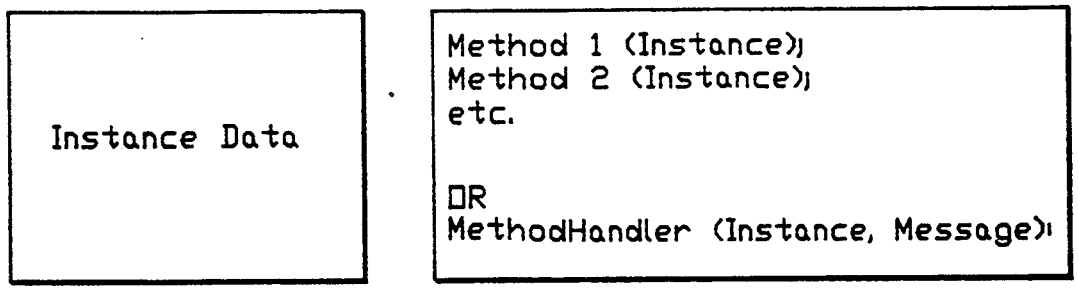
FIG.—39
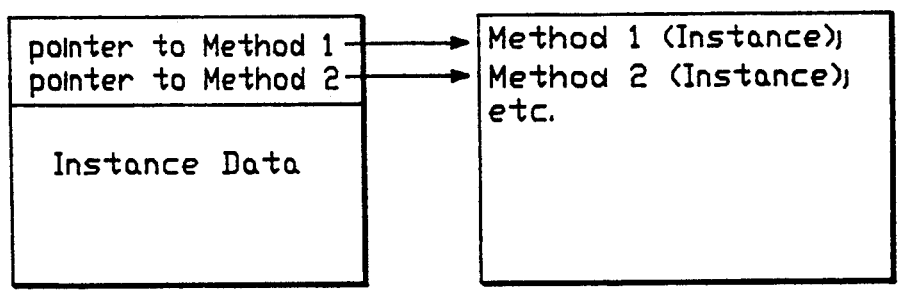
FIG.—40

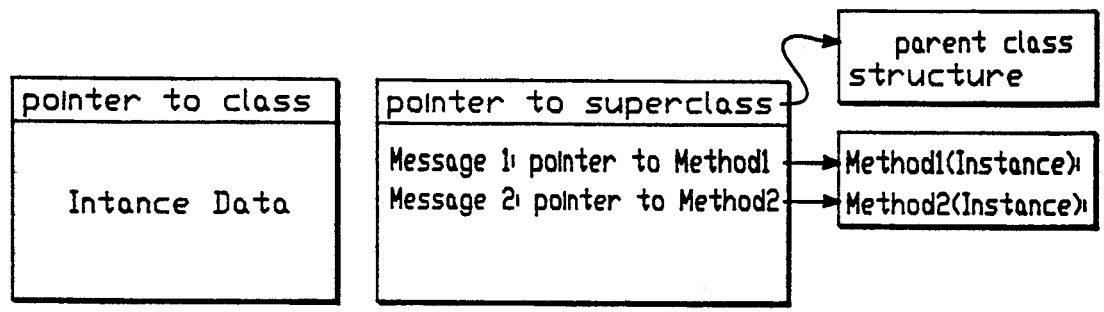
FIG.—41
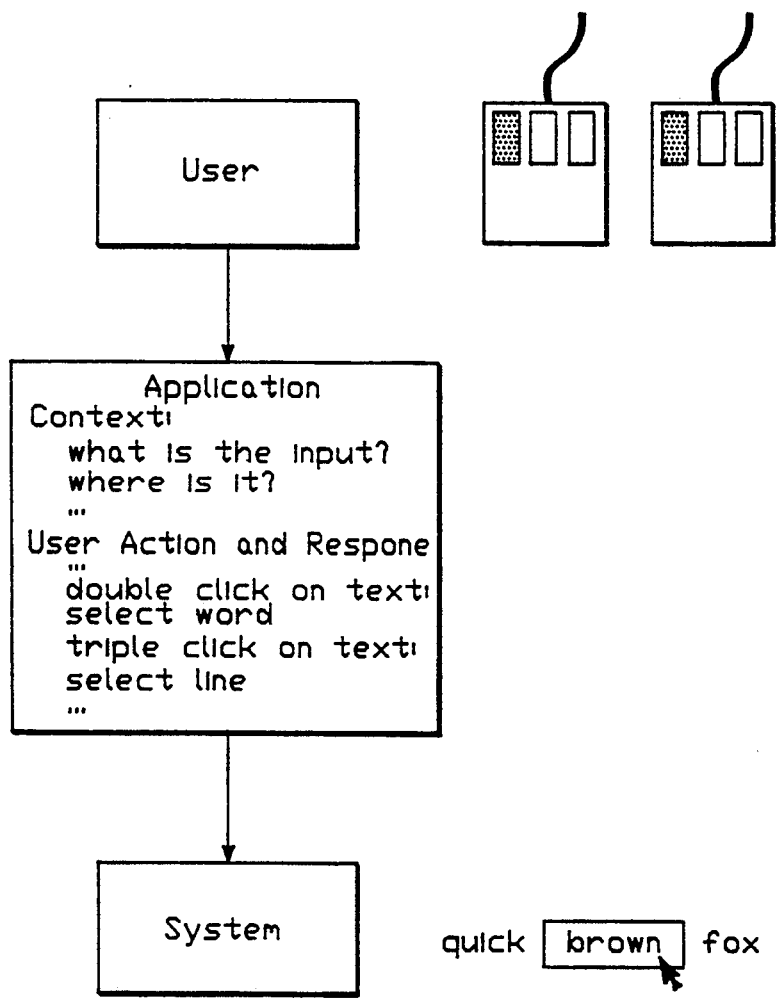
FIG.—42
(Prior Art)

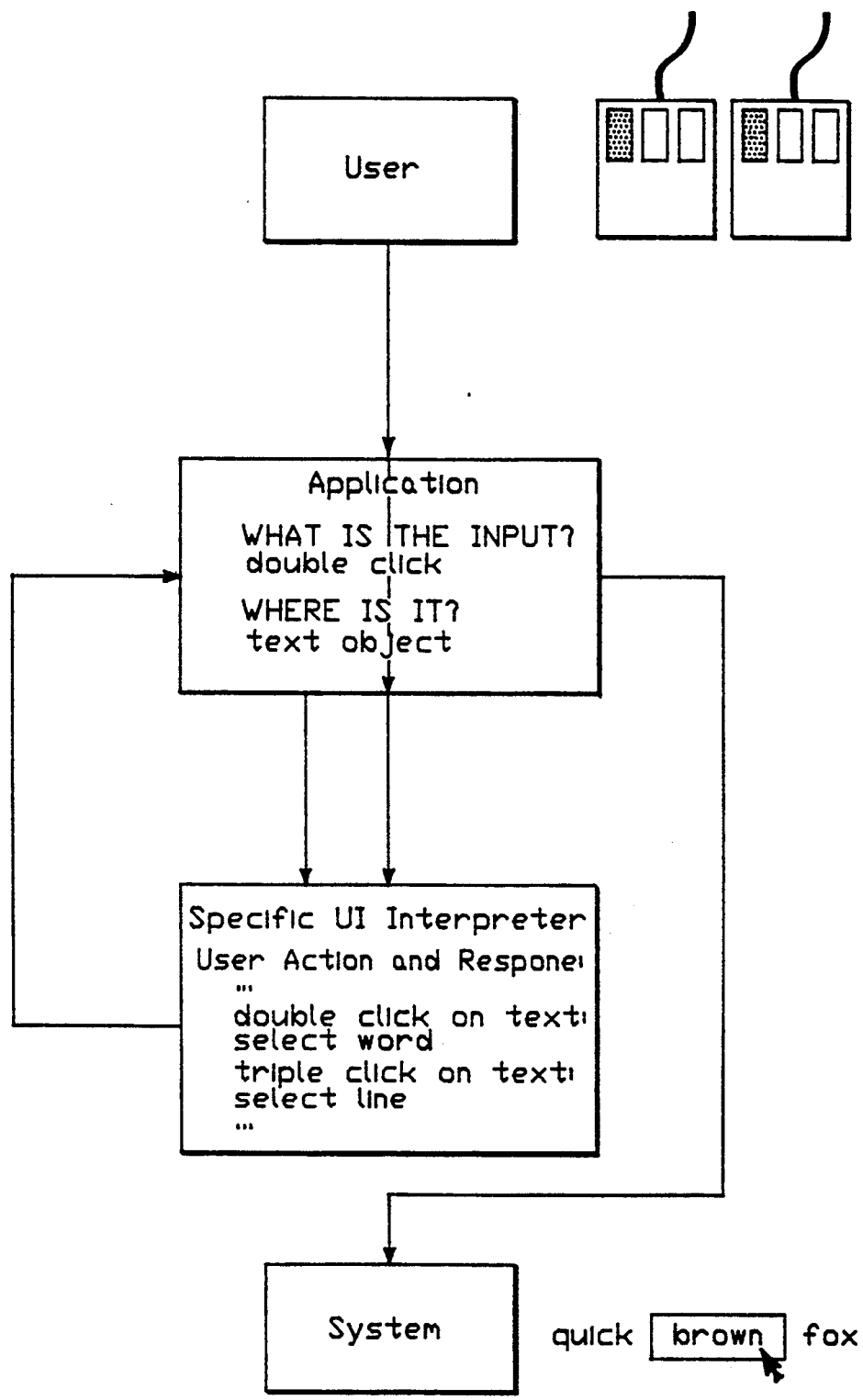
FIG.—43

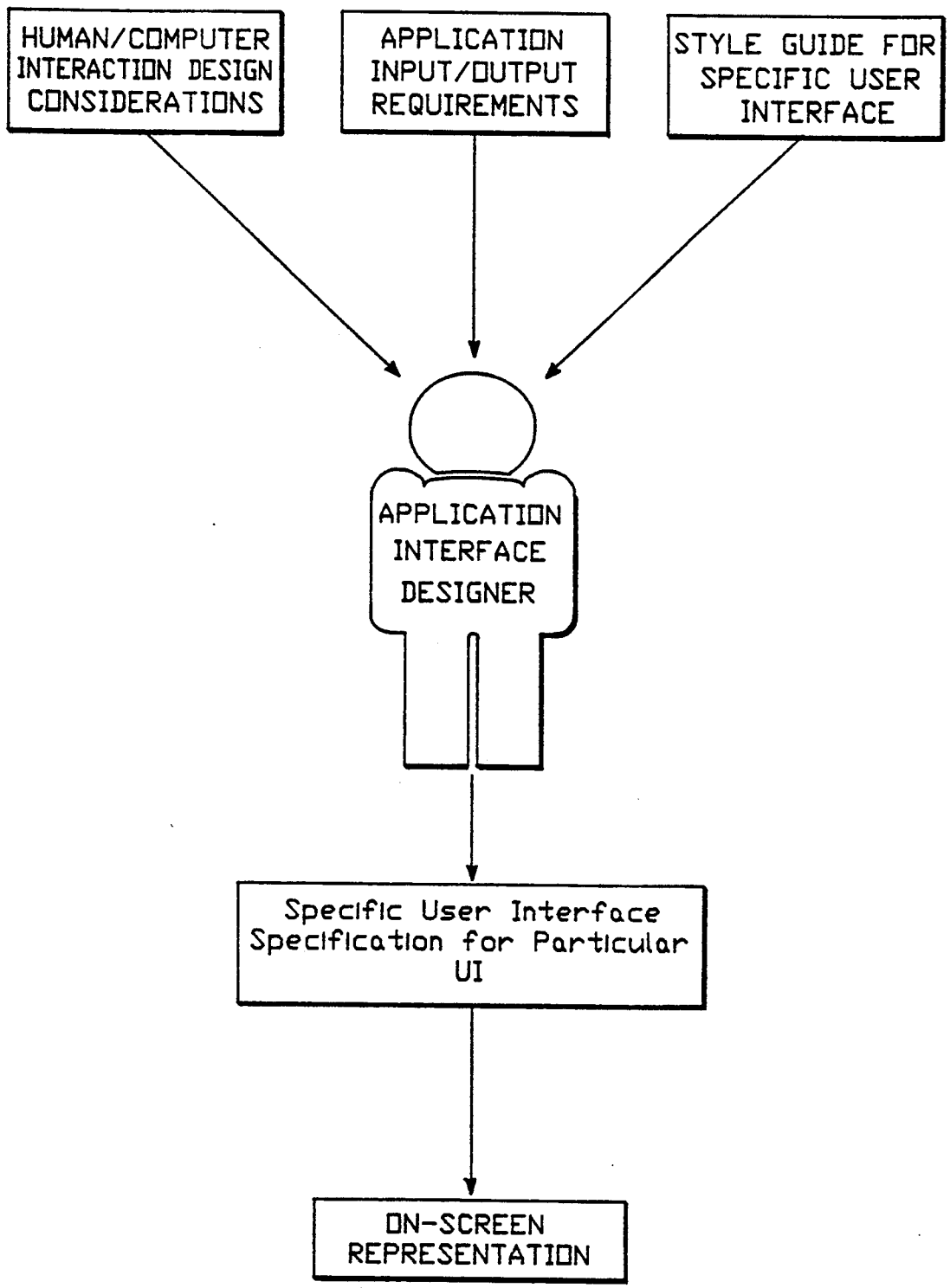
FIG.—44
(Prior Art)

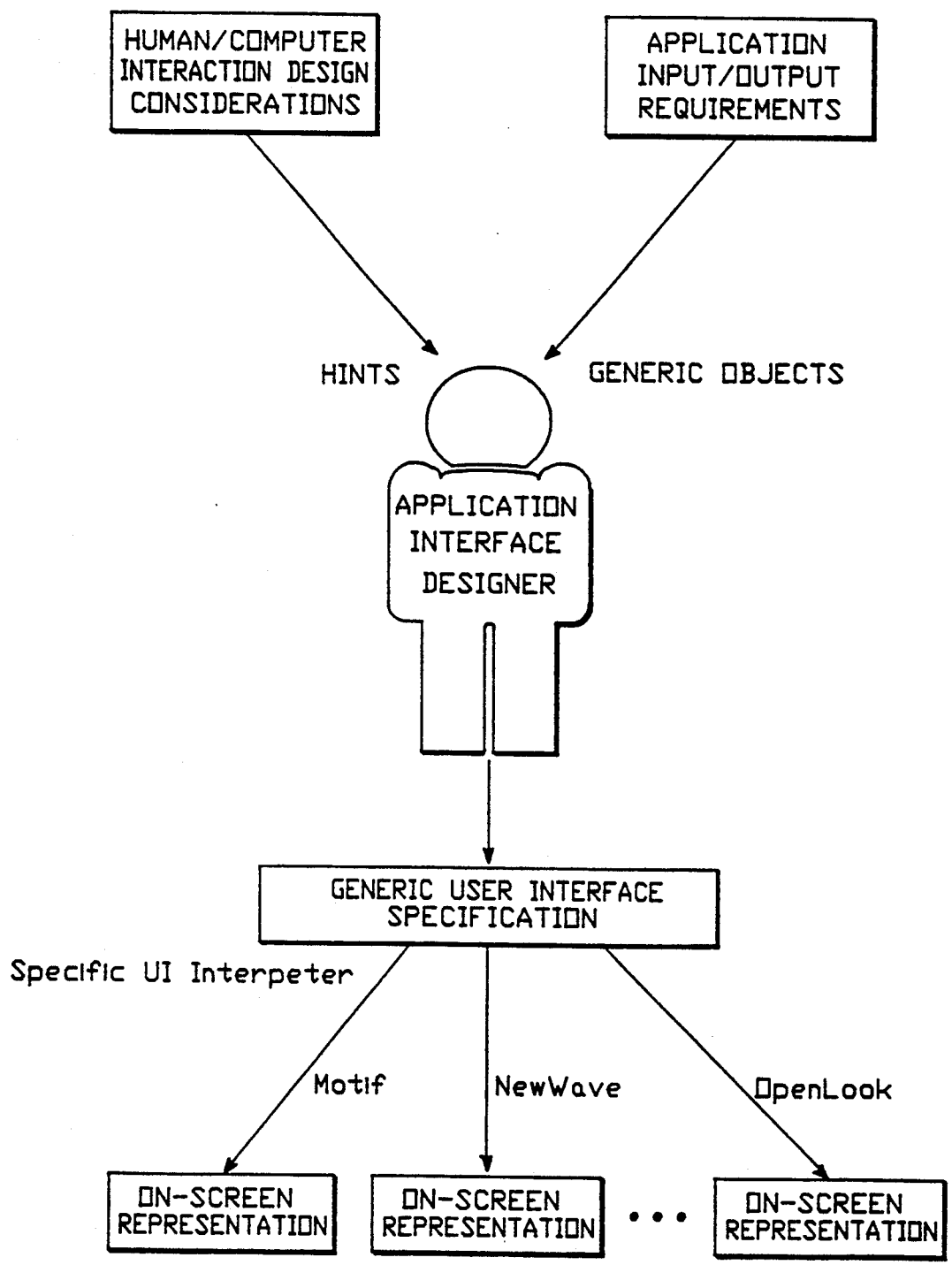
FIG.—45

FIG.−46
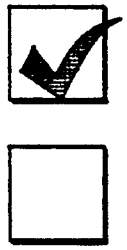
FIG.−47

PROCESS OF DESIGNING USER'S INTERFACES FOR APPLICATION PROGRAMS

This application is a continuation of application Ser. No. 07/681,079, filed Apr. 5, 1991, now abandoned, which is a continuation-in-part of application Ser. No. 07/586,861, filed Sep. 24, 1990, now abandoned.

BACKGROUND OF THE INVENTION

1. Field of the Invention

In general, the present invention relates to an application program operating in a computer and, more particularly, the invention relates to a process for designating a user interface of an application program.

2. Description of the Related Art Applications

An application (or program) is a tool which allows a person to use a computer to accomplish a task. For example, a word processor provides the user of a computer with a way to write, store, and print out letters. A drawing program allows him to create charts, diagrams, and organizational charts. As far as the user is concerned, the application is the interface between him and the computer hardware. However, from the application's perspective, there is another layer.

Operating Systems

An operating system is a program which acts as an interface between applications and the computer hardware. It provides an environment in which a user may execute programs. Operating systems attempt to make the computer system easy and efficient to use. Operating systems in conjunction with the computer hardware are often called environments. These principles are discussed by James Peterson and Abraham Silberschatz in "Operating System Concepts".

User Interfaces

A user interface (UI) is a set of rules and conventions by which a computer system communicates with the person operating it. Initially, operating systems (such as UNIX or MS-DOS) featured text-based command line interfaces. Users were expected to use and remember complicated, forgettable commands such as "enscript-2Gr-Plw." Different applications all had different user interfaces—to print the current document, a user might have to press the function key F7 in a word processor and the keys Ctrl-Alt-P in a database program. Computers were difficult to learn, difficult to use, and, worst of all, inconsistent. In the pursuit of the often-coined property known as "user friendliness," much work was done in terms of improving user interfaces. Just as the personal computer market as a whole is changing rapidly and drastically, so too are user interface standards. Through the years, operating systems have evolved from complicated text-based, command line interfaces, like UNIX or MS-DOS, to graphical, windowing interfaces such as the Apple Macintosh and Microsoft Windows. These new graphical user interfaces (GUIs) feature menus, buttons, and windows accessed by a mouse. The graphical, intuitive nature of these interfaces solved many of the problems inherent in earlier operating systems. GUIs typically provide a large tool kit of user interface gadgets such as windows, buttons, and menus. Applications make use of these UI items to implement their interaction with the user. In order to avoid inconsistent application interfaces, companies develop rules and conventions for using the UI gadgets. Documents known as style guides are provided in an attempt to instruct application designers in the appropriate usage of the user interface gadgets offered by a system (see "Style Guides" for more detailed information). Some examples of such user interface standards are OSF/Motif, OpenLook, CUA, NewWave, and Macintosh. Each of these standards shall be referred to herein as a specific user interface.

However, even applications developed for a "user friendly" environment like Windows or Macintosh sometimes can be difficult to use. As applications have become more and more powerful, some have also become more and more difficult to use. There are so many fascinating and complex things users can do with these new programs that it can be very difficult to create a user interface that is always easy to use. A new concept in the GUI community attempts to come to terms with this problem. It is the scalable graphic user interface. Such a GUI allows the same applications to be accessed at various levels of functionality. These levels range from an appliance mode, where users are only required to push a few buttons, to a novice computer interface (such as Tandy's Deskmate ™), to a full-fledged professional graphic user interface like the Motif ™ interface. Users, as their skills and needs grow, may simply switch interface levels to access more powerful features. So, for example, if users only want to quickly type a letter or envelope, they do not have to wade through a program designed to produce newsletters involving multiple columns of text running from page to page and graphics placed randomly throughout the document. They can merely run the word processor in appliance mode and type a simple letter without having to set many different options and to pick their way through a number of extra features (See "Style Guides" for how scalability relates to style guides).

Applications Development

Applications have always been difficult and time-consuming to develop. However, because of the volatile and diverse nature of the computer software industry, creating applications which execute under different specific user interface standards often can be exceptionally challenging. In the past, much or all of the application often was rewritten in order to conform to the various standards, and each version often was offered for sale separately.

Some applications have implemented the scalable GUI concept to some extent. Programs such as Microsoft Word have "full and short menu" modes; novices may choose "short menus," which hides advanced functionality by simply removing advanced commands from the main menu. The user still has to contend with multiple windows and pull-down menus, difficult enough concepts in their own right. However, very few programs even feature this limited scalability. Usually, if users would like both a simple word processor and an advanced word processor, they would have to purchase two separate packages (in fact, some software publishers offer several similar packages of varying complexity in their product line.

Conventional Application Design Process

The typical process of writing an application is as follows. An environment is chosen (e.g., UNIX workstation running Motif). The functional goals of the program are specified (e.g., a powerful word processor). Then the user accessibility goals are specified (e.g., must be easy and intuitive to use and follow Motif guidelines). A programmer or team of programmers implements the functionality, and a human interface expert or team (perhaps the same programmers) designs the user interface to conform with the style guide for the environment.

We will focus on the user interface designer. The interface designer balances human/computer interaction design considerations, application input and output requirements, and the style guide for the specific user interface to create a specific interface description (typically in the form of user interface objects with attributes) for the application. The graphical user interface system software then implements this specific description, creating an on-screen representation.

If an operating system could somehow interpret the user interface needs of an application and provide a good implementation of one or more style guides, both application developers and users would benefit.

SUMMARY OF THE INVENTION

It is an objective of the present invention to provide a new process for generating on-screen application interface for an application program.

It is another objective of the present invention to provide a new process for generating user interfaces for application programs.

It is another objective of the present invention to provide a new process for generating the on-screen application interface in such a way that the application is largely independent of changes in specific user interfaces. Developing an application is a challenging and time-consuming project. One essential aspect of this process is the design and implementation of the application's user interface. In the traditional process of interface design, the developer defines application input/output requirements and a list of human-to-computer design considerations associated with those requirements. Referring to the style guide for the specific user interface (e.g. Motif, OpenLook, or Windows) for which the application is being designed, the designer melds all three considerations together when defining the user interface. He makes selections from the gadget toolkit offered by the specific UI and decides how those objects should be arranged on the screen. These selections and decisions are made with an eye toward subjective design considerations. The exact final interface design is then stored in data structures, which are later faithfully rendered on screen by system software. To run the application under a different specific UI, the design process would have to be repeated from scratch, yielding a new executable version of the application.

BRIEF DESCRIPTION OF THE DRAWINGS

FIG. 3 illustrates a dialogue box.

FIG. 4 illustrates a menu.

FIG. 5 illustrates pixels on a screen.

FIG. 6 illustrates a scroll bar.

FIG. 7 illustrates a scrolling list.

FIG. 8 illustrates a submenu.

FIG. 9 illustrates hierarchy of objects in tree data structure.

FIG. 10 illustrates a window.

FIG. 11 illustrates the salesman example.

FIG. 14 illustrates an on-screen realization of the sample user interface tree of FIG. 13.

FIG. 15 illustrates a sample user interface screen of a prior art Macintosh application.

FIG. 21 illustrates a computer system incorporating elements in accordance with the present invention.

FIG. 22 illustrates a prior art computer system.

FIG. 23 illustrates a document control object.

FIG. 24 illustrates a NewWave TM interpretation of the document control object of FIG. 23.

FIG. 25 illustrates an OpenLook TM interpretation of the document control object of FIG. 23.

FIG. 26 illustrates a Motif TM interpretation of the document control object of FIG. 23.

FIG. 27 illustrates a list object and some possible hints that can be used as instance data for that object.

FIG. 28 illustrates a NewWave TM interpretation of the list object of FIG. 27.

FIG. 29 illustrates an OpenLook TM interpretation of the list object of FIG. 27.

FIG. 30 illustrates a Motif TM interpretation of the list object of FIG. 27.

FIG. 31 illustrates a style guide interpreter that provides three possible gadget choices (Abbreviated Menu Button, Exclusive Settings and Scrolling List) with an example of a screen display and style guide interpreter interpretation rules for each.

FIG. 32 illustrates a style guide interpreter that provides two possible gadget choices for a hypothetical user interface (Graphical Radio Buttons and Scrolling List) with an example of a screen display and style guide interpreter interpretation rules for each.

FIG. 33 illustrates a generic user interface specification for the GenList object and an OpenLook TM user interface interpretation and a hypothetical user interface interpretation of the generic GenList object.

FIG. 35 illustrates an interpretation of an object having the specification of FIG. 34 under Motif TM or OpenLook TM.

FIG. 36 illustrates an interpretation of an object having the specification of FIG. 34 under a hypothetical user interface style guide.

FIG. 39 illustrates an implementation of the principles of the invention using procedural programming rules.

FIG. 40 illustrates an implementation of the principles of the invention using objects using pointers to methods.

FIG. 41 illustrates an implementation of the principles of the invention using objects having class pointers to class structures.

FIG. 42 illustrates a prior art user interaction with an application to produce an action in a computer system.

FIG. 43 illustrates a user interaction with an application in accordance with the present invention to produce an action in a computer system.

FIG. 44 illustrates prior art development and use of a specific user interface specification for a particular user interface.

FIG. 45 illustrates development and use of a generic user interface specification for use with any of multiple specific user interface interpreters (Motif TM, NewWave TM and OpenLook TM, for example), and the use of such generic user interface to produce different on-screen displays using such different specific user interface interpreters.

FIG. 46 illustrates a one-choice element of a control area or a menu, used in various ways such as to execute commands, display pop up windows, and display means.

FIG. 47 illustrates a non-exclusive setting that shows a checkmark in a square box when a setting is chosen.

DETAILED DESCRIPTION OF PREFERRED EMBODIMENT

Before explaining the principles in the present invention, it is useful to define a group of terminologies as follows.

gadget toolkit set of components such as windows, menus, buttons, scrolling lists, radio buttons, scroll bars, etc. A portion of every specific user interface's style guide concerns itself with the enumeration, definition, and uses of these components generic UI object class group of generic UI objects with identical types of data and methods generic UI object uI component representing an input/output need of an application (as opposed to a visual specification such as a scrolling list). Examples include document control, exclusive list selection, and viewing areas.

generic UI object library set of generic UI objects and hints available for specifying an interface independent of any particular gadget toolkit generic user interface specification interface designed for a particular application based on objects from the generic UI object library, including the selection and organization of objects and hints generic to specific UI interpreter (UI Interpreter)

software which interprets a generic UI specification to create the on-screen representation of the application in such a way that a specific UI's style guide requirements and recommendations are met hint embodiment of human/computer interface criteria for an application, stored digitally. Examples of such criteria follow:
"infrequently used feature"
"advanced feature"
"should be displayed as large as possible"

specific user interface the look and feel ONLY of a particular user interface specification, such as Motif, Open Look, Windows, or Macintosh, as denoted by that user interface's style guide (i e the end user's perception of the user interface, separated from the API and software)

specific user interface specification interface designed for a particular application based on gadgets from a specific user interface's gadget toolkit

Conventional Application Design Process

Figure 1:
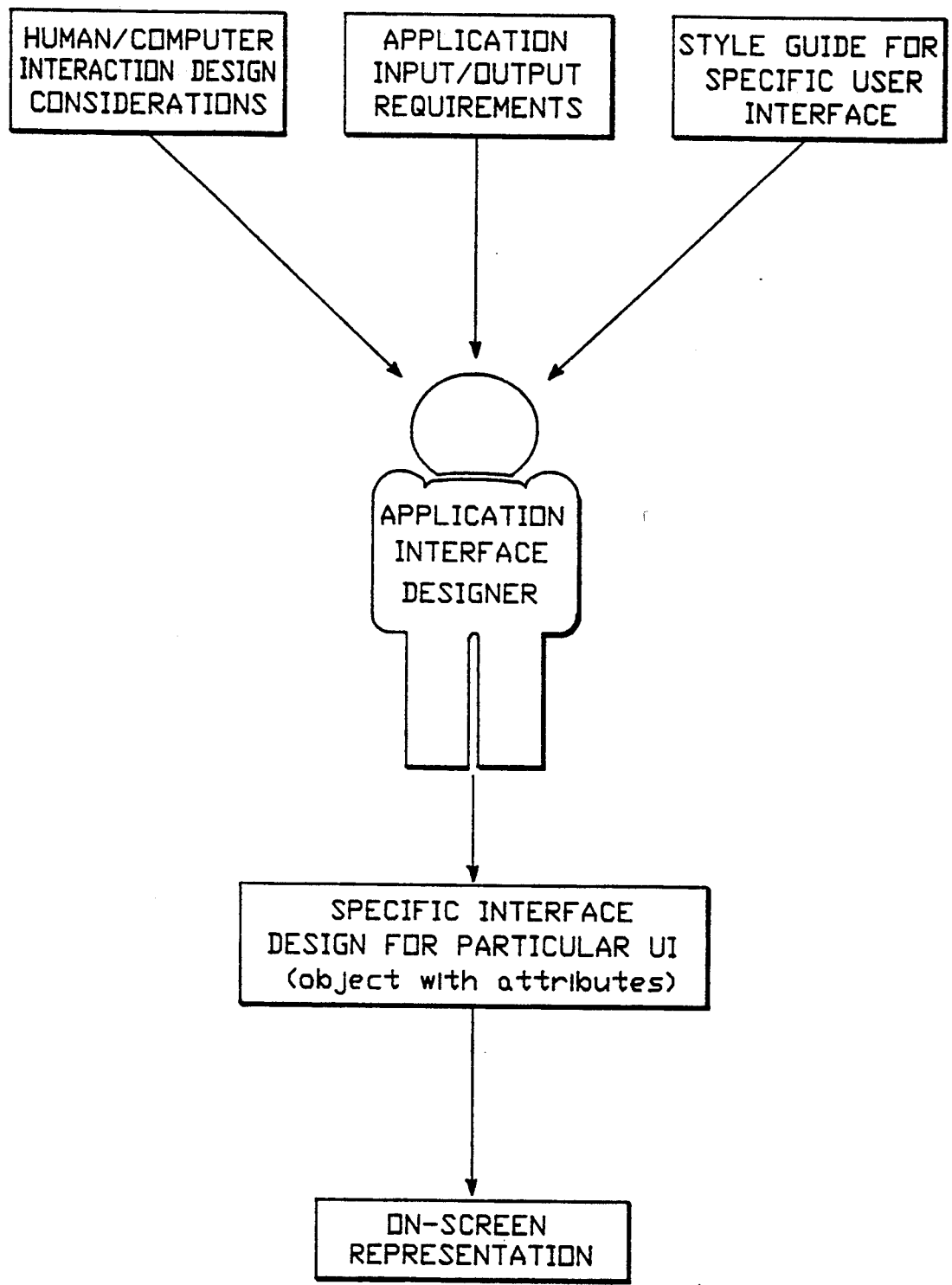
FIG. 1 illustrates a conventional application design process.

The process of the present invention has redefined how application user interfaces are developed. The illustrative drawings of FIG. 1 shows a representative conventional process for developing an application. In contrast to the conventional process, a designer using a new process in accordance with the present invention does not attempt to define the final, gadget-level interface to the application. Instead, referring to FIG. 2, he selects objects from a generic UI object library based solely on the input/output requirements of the application, and groups them according to function within the application. Subjective design considerations associated with those requirements, which would ordinarily be weighed by the designer in order to pick specific gadgets, are instead stored digitally along with the generic UI objects. The designer's job is done, as everything short of the style guide has been considered and stored as part of the UI specification for the application. This data is later interpreted in software by any one of a number of UI interpreters, which map the selected generic UI objects and hints into an interface implementation which meets the specific UI's style guide requirements. The final interface for the application is then presented on-screen.

GEOS Application Design Process

Figure 2:
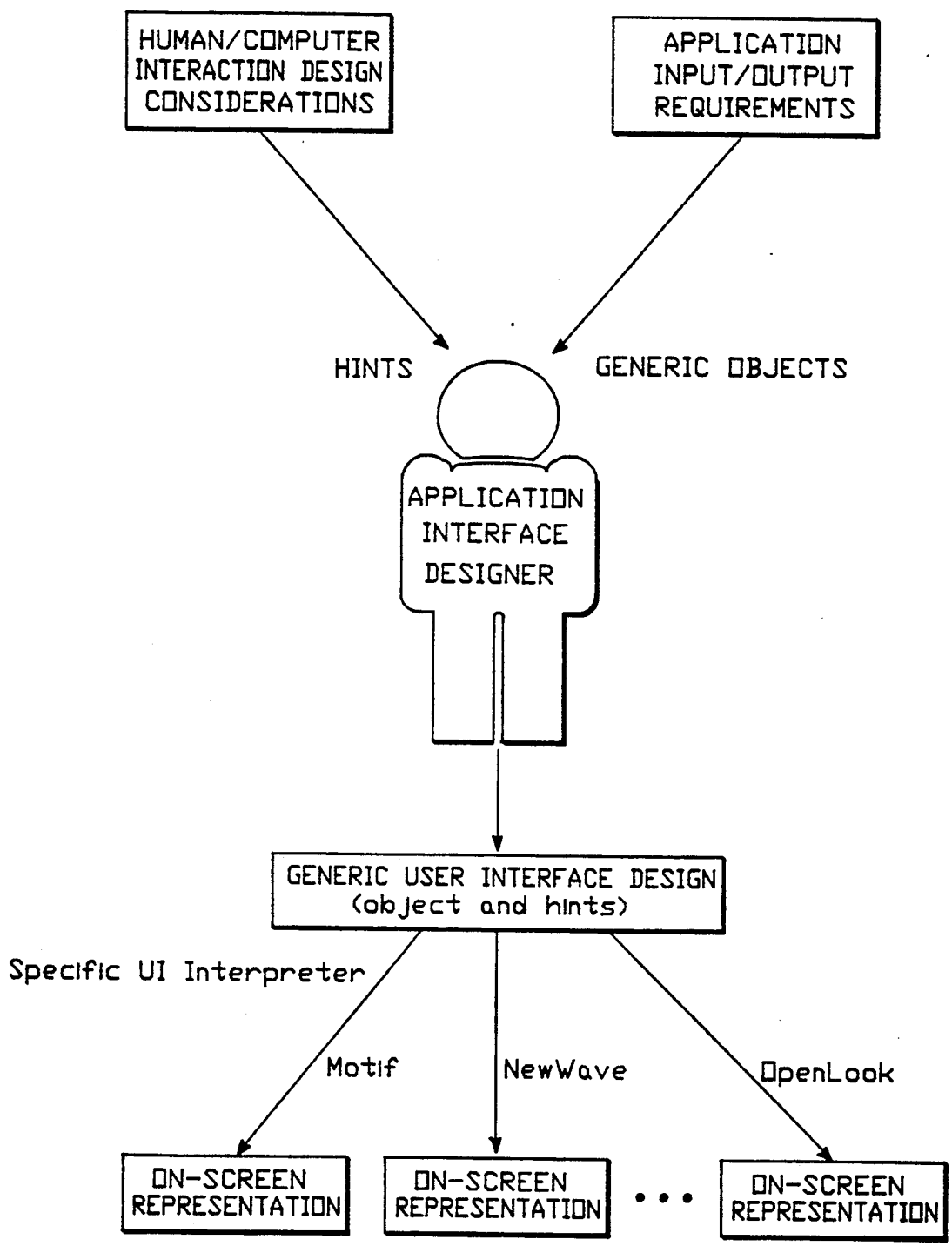
FIG. 2 illustrates a application design process according to the present invention.

The process of the present invention allows the same application executable to come up with the look and feel of any number of specific user interfaces, meeting the style guide requirements and recommendations for each. The illustrative drawing of FIG. 2 shows an application development process in accordance with the present invention. The more information about the application's interface requirements and subjective considerations that can be stored in generic object and hint format, the better the interface that can be created for the application when running under UI interpreters for different or new specific user interfaces. Since the generic model essentially decouples the application from its user interface, the application is completely independent of changes in specific user interfaces. The application's user interface is specified solely in terms of common semantic properties rather than specifics of particular UI gadgets, so the application's user interface can be properly constructed and presented under new and different specific user interfaces. New UI interpreters for new style guides can he written after the creation of an application executable, and the application's user interface will be presented in accordance with the new style guide. What this means is that new, improved user interfaces could add novel and wonderful capabilities far beyond that imagined by the original application designer, simply because functional as well as subjective information about the application's UI needs are stored with the application. Similarly, specific user interfaces intended for users with varying levels of proficiency may be defined, so the very same application executable can also be presented appropriately to both novice, average, and advanced users.

The question then is how to accurately represent, in data, application input/output requirements and subjective design considerations. The GEOS process replaces traditional gadget toolkits with a generic UI object library and stores subjective, descriptive considerations digitally in hints.

Generic UI Object Library vs. Gadget Toolkits

As mentioned before, conventional operating systems provide the developer with gadget toolkits. These toolkits generally attempt to provide a large number of simple as well as sophisticated user interface components. The idea is that given a plethora of low-level building blocks, the interface designer may use, combine, and organize them in such a way that he can balance size, speed, and complexity issues. Unfortunately, this method of defining user describing and storing the core, fundamental input/output needs or capabilities of an application. And it does not necessarily give any indication of the raw subjective information the designer considered in order to select from the gadgets available and to lay them out.

The generic UI object library overcomes these limitations. Input/output needs are abstracted to the highest level possible. Functional needs are identified and placed into distinct categories, called generic UI object classes. The subjective, descriptive thoughts and considerations previously existing solely in the mind of the UI designer are stored as characteristics, known as hints, of the application and its user interface.

The following sections elaborate on how the new model improves substantially upon prior art, on a practical as well as a conceptual level.

Abstractions In Scope

To properly present a given application in any number of different specific user interfaces, it is necessary to abstract many higher-level functional requirements of the application. Otherwise there is a risk that an interface specified for one style guide which might contradict the requirements of another. For instance, two style guides may conflict in their requirements for what must appear in the "File" menu:

Hypothetical Specific UI "A" Example

Style guide "A" requires "File" menu to have these menu items:

New—creates a new document
Open . . . —opens a previously created document
Close—closes an open document (user chooses whether to save changes)
Save—saves changes but does not close document
Save As . . . —save changes under a different name, original document is untouched
Copy To . . . —copies modified document to another file name
Exit—exit from program (user chooses whether to save and close document

Specific UI "B"

Style guide requires "File" menu to have these menu items:

Create—create a new document
Open . . . —open a previously created document
Close—close and save a document
Quit—end program (automatically save document)

A specific UI specification which provides a "File" menu with the items required for specific UI "B" would be an illegal interface for specific UI "A" since menu items are named differently and function differently. This problem is solved by abstracting the fundamental need for "document control" within an application. Most applications have a need to manage and manipulate documents, so the generic UI object library provides a single GenDocumentControlClass object. This object, if chosen for use in an application's interface, stores the abstract concept that the application performs operations on files and therefore needs the user interface to allow the user to manipulate files. The generic UI to specific UI interpreter software for each of the above specific UIs processes the existence of a GenDocumentControlClass object by creating the appropriate file menu, as specified by the style guide.

By contrast, conventional methods of application design often require the developer to create two distinct executables to conform to A and B's style guides. One would contain code to generate the proper File menu with the one type of behavior. The other would contain different code to generate the shorter File menu with another different type of behavior.

Abstraction of Function

A common interface requirement of an application is to let the user choose between a number of different options. Some of the gadgets available in different specific UIs which may be used to accomplish this are:

a scrolling list of items, of which one is highlighted
radio buttons, of which one may be selected (pushed in, like the buttons on a stereo receiver to choose between Tuner, Tape, CD, etc.)
a menu of items, in which the last one selected is checked
a pop-up list, whereby the current selection is shown. Clicking on it brings up a window which shows the rest of the possible selections. Dragging the mouse over the desired item and releasing selects it.

Most specific UIs offer one or more of these options, yet the basic abstract input/output requirement is the same—the user may choose one item out of a list of several. The generic UI object library classifies each of the gadgets above as being functionally identical, and thus provides only the GenListClass object. The choice of specific implementation is left up to the UI interpreter. As a result, applications are not bound to only using a particular gadget. For example, a traditional application might choose to use a scrolling list. A pop-up list might be more appropriate, but suppose it hadn't been invented yet. The application is stuck with the scrolling list because it is hard coded into the program. With the new approach, the application would take advantage of the newest technologies available. Conversely, the GEOS application also works properly under a specific user interface which forbids the use of scrolling lists, whereas the traditional application would not.

Storage of Subjective Design Considerations

In order for existing and future UI interpreters to make intelligent decisions on the choice of UI gadgetry, the proper information must be available. Beyond the functional behavior that the application needs or expects, the designer knows other, less tangible information. For instance, when implementing a list where the user chooses from a number of different options, the designer might know which of the following general characteristics might apply:

This feature is obscure
This feature is commonly used
This feature is easily understood
This feature is advanced He would probably know more specific characteristics:
Want to see as many of these items at a time as possible when choosing
Going through each item one at a time while choosing is fine
Want to see all options (selected and unselected) at all times These subjective pieces of information can be enumerated and appropriate statements "stored" along with generic UI objects. In this case, the GenListClass object would be able to incorporate all of the considerations listed above.

Hints

A hint is an embodiment of human/computer interface criteria for an application, stored digitally. The following example illustrates how they are used. First, suppose we have three hypothetical specific user interfaces: A, B, and C. Their style guides might specify the following:

Specific UI A

Scrolling list gadgets

Specific UI B

Requires an "Options" menu, which has "Novice" and "Advanced" menu commands. Advanced features should only appear when "Advanced" menu item is selected
Scrolling list gadgets
Pop-up list selection gadgets

Specific UI C

Intended for novice users—applications should provide basic behavior and not be overly complicated
Radio button gadgets

Example: Sample UI Component

Let's look at how we would describe a UI component with the old and the new approach. Suppose our application required the user to choose one of the 50 states. For the application, the state selection item is unimportant and unnecessary to its functionality.

Traditionally, the designer would think about the UI component and the many different ways he could present it. He would weigh the considerations imposed by the fact that the item is unimportant. If he were writing for Specific UI A, he would choose a scrolling list gadget containing the 50 states since he had no other choice. If he were writing for Specific UI B, he would have a choice between a scrolling list and a pop-up list. He would choose a pop-up list gadget containing the 50 states since it takes up less space than a scrolling list. He would also implement the functionality necessary to remove the pop-up gadget when the user chooses "novice" mode. If he were writing for Specific UI C, he would not include the option at all, since the UI is designed for novices. Each of these decisions for each of the specific UIs would be coded into each different version of the application. Changes in the UI for any one of the applications would require the program to be modified or rewritten.

Now, let's look at the new design process. Functionally, the designer knows that the user has the choice of one item out of fifty. So, he chooses a GenListClass object, which encompasses the abstract functionality of choosing from a list. He attaches a list of the 50 states to choose from. Next, he assigns subjective considerations to the object, selecting the following hints:
feature is important
feature is unnecessary to functionality of application
feature should occupy very little screen space
user does not need to see all of the options at once That's it. He's done. No program code is written. Subsequently, when the application is executed under each of the three specific user interfaces, the associated UI interpreter chooses a gadget to fit the description.

Specific UI A Interpretation

Because the component is a list object, it is implemented as a scrolling list gadget (no other gadgets are available).

Specific UI B Interpretation

Because the feature should "occupy very little screen space, it is implemented as a pop-up list gadget. Furthermore, since it is unimportant and unnecessary", the component is removed when the user selects the Novice mode.

Specific UI C Interpretation

Because the feature is "unimportant" and "unnecessary," it is not included in the application's user interface.

So, by merely defining the application's user interface using generic UI objects and hints, the single application executable can be run under many different specific user interfaces at many different levels of functionality. To the developer, it's a better product and time and resources are saved. To the user, it's five (or more!) programs for the price of one.

Additional Hint Examples

The definition and incorporation of a comprehensive set of hint values greatly increases the adaptability of applications to future developments in user interface technology.

Therefore, the GEOS process offers many different types of hints. In addition to functional hints as described above (size, importance, etc.), there are task related hints. For instance:
This feature would appeal to someone constructing a resume
This feature would appeal to someone constructing a term paper
This feature would appeal to someone constructing a report
This feature would appeal to someone constructing a schedule This feature would appeal to someone constructing a poster These hints might be used by a task-oriented specific user interface. Other types and categories of hints can be defined. The more of these that are incorporated, the better the implementation of an application's user interface under future style guides (e.g. one developed for 3D holographic computer displays).

Before explaining the embodiment according to present invention, it is useful to list some more conventional definitions in a glossary.

Conventional Glossary application tool which allows a person to use a computer to accomplish a task application program interface (API)

the package of the many system services that the operating system makes available to a program and the techniques developers use to call them button one-choice element of a control area or a menu, used in various ways such as to execute commands, display pop up windows, and display menus; See FIG. 46 check box non-exclusive setting that shows a check mark in a square box when the setting is chosen; see FIG. 47 class group of objects with identical types of data and methods data structure tables of data including structural relationships declarative language programing language in which the order of execution is well defined, branching and looping as necessary; individual functions and procedures operate on separately defined and maintained data development tool tool, generally a software program, which is either essential to the application development process or which makes the process faster and more convenient dialog box rectangle containing elements that elicit responses from the user, typically several at a time; the drawing of FIG. 3 shows an illustrative dialog box environment combination of an operating system and the particular computer on which it is used executable binary file which contains application code; single file which may be run by the user graphic user interface user interface based upon pictures and objects rather than text and commands inheritance classes have instance data and methods in common with classes above it in a hierarchy instance specific incarnation of a certain type (class) of objects library module of executable code which is dynamically loaded into memory when needed by one or more applications. Only one copy of a library module is loaded at a time and is shared by all executing applications menu rectangle containing a group of controls (basically a "multiple-choice" control). Usually accessed as a pull down menu from the main menu area or as a pop up menu from any place on the screen; the drawing of FIG. 4 shows an illustrative menu message an object sends a message to another object to make it perform a particular action method program code in an object which responds to a particular message modal usually used in conjunction with "dialog box'-'—means that the user must respond before continuing; he can do nothing else object self-contained data structure which contains instance data and methods object oriented programming programming language based on self-contained objects which send messages to each other to get things done operating system program which acts as an interface between applications and the computer hardware pixel single dot on the screen arranged in a rectangular grid; images on the screen are composed of many individual pixels of certain colors; the drawing of FIG. 5 shows a curve formed from individual pixels procedural language programming language with a well defined flow of execution during which procedures operate on data to accomplish tasks resource data or code, separate from actual program code, stored in a resource file resource file file or part of a file that contains data used by an application, such as menus, fonts, and/or icons scalable user interface user interface which allows the same applications to be accessed at various levels of functionality and complexity scroll bars control used to move the view of the data displayed in a view; the drawing of FIG. 6 shows a representative scroll bar scrolling list pane containing a list of text fields. The list can be read-only or it can be editable; the drawing of FIG. 7 shows a representative scrolling list style guide document intended to impose visual and operational consistency across the set of applications running in a particular environment. See Appendix E.

submenu menu that displays additional choices under a menu item on a menu; the drawing of FIG. 8 shows a representative submenu system software see operating system tree hierarchy of objects; the drawing of FIG. 9 shows a sample tree hierarchy structure user interface (UI)

set of rules and conventions by which a computer system communicates with the person operating it user interface component see user interface gadget user interface gadget item which has some function in allowing the user to communicate with the computer, e.g. button, menu, window user interface tool kit collection of user interface gadgets offered by an operating system for use by applications window rectangle containing application elements; the drawing of FIG. 10 shows a sample window

Object Oriented Programming

Object-Oriented programming is an approach to programing which is vastly different than traditional procedural programming. Programming languages such as C and Pascal consist of functions and procedures which manipulate data. The program code executes in a well-defined order, looping and branching when necessary. Object-oriented programming, on the other hand, groups data and procedures in a bundle known as an object. There is no predictable flow of execution.

The five main concepts of object-oriented programming are: objects, methods, messages, class, and inheritance. Each is described below.

Objects

Objects are self-contained units (data structures) which contain data (called instance data) and procedures (called methods) to modify their own data. Objects send and receive messages. For example, suppose a dog is an object. The commands you give him are messages. He learns those commands, and the responses he remembers are his methods. So, if you instruct the dog to "Sit," you are sending him a 637 Sit" message. He receives the "Sit" message, initiates his "Sit" method, and subsequently sits on the ground.

Messages

A message roughly corresponds to a procedure call in C or Pascal. An object sends a message to another object to make it perform a particular action. This is also known as invoking another object's method. This way of accomplishing tasks is a natural extension of how humans interact. For example, referring to FIG. 11, when a traveling salesman appears at your door, you say, "Go away," and he leaves. You give a command and expect the recipient to handle it. This is how users interact with their computers, and this is why object-oriented programming lends itself so well to a user-driven system.

Methods

Methods directly translate to procedures and functions in procedural languages. A method is the program code in the object which responds to a particular message. In the above example, the salesman's "Go away" method was his knowledge that when someone says "Go away" he should turn around, walk away, and remove your name from his list of potential customers (his instance data).

Classes

Classes are groups of objects with identical types of data and methods. Objects in a class share common sets of data and knowledge of how to respond to certain messages. Each object is called an "instance" of a class. For instance, the salesman above might be an instance of the "Acme Encyclopedia Salesmen" class. He and other fellow instances of the "Acme" class all know how to respond to a "Go away" message because of training from their supervisor.

Classes are organized in a hierarchical structure. Classes inherit behavior from classes above it. For example, the class "dog" might be defined as:

Dog
    Pretty Dog
        Poodle
        Doberman
    Ugly Dog
        Pit Bull Sample Class Hierarchy

Inheritance

The class Dog has subclasses Pretty Dog and Ugly Dog. These subclasses may have subclasses of their own. Due to inheritance, if the class Dog contains a method "Sit," then every subclass (Pretty Dog, Ugly Dog) also understands that method. So, if an instance of the class Poodle receives a "Sit" message, it doesn't need to have its own "Sit" method. It simply passes the message up to the class Pretty Dog which passes the message to the class Dog.

Why Is Object-Oriented Programming Natural?

The world in which we live is composed of objects. And as we saw earlier, we accomplish much of what we do by sending messages to other objects in our world and reacting to their messages. Furthermore, we generally do things by telling other objects what we want done rather than by explaining in great detail how to do them. The how describes the procedures and is part of the procedural programming model. The what describes the task, the problem, and its solution in descriptive, or declarative, terms, and is part of the declarative programming model of which object-oriented programming is a prime example. When you give your computer a print message, you don't tell it, "Now I want you to take this document that I've just finished creating and analyze its bitmap structure. Got it?" You just tell it to print and expect it to follow.

Similarly, if you give an assignment to a subordinate, you generally say, "I need the quarterly objectives report on my desk by 3:00, Jim." You don't say, "Jim, I want you to sit down at your desk. Take out a piece of paper and a pencil. Now, put at the top of the paper . . . ."

But these descriptions—simplified for illustration—are good summaries of the differences between procedural programming and object-oriented programming. The world just doesn't work procedurally. Consequently it is much easier to write programs designed to emulate or simulate reality and intelligence in object-oriented programming environments than in more procedure-oriented environments. See Dan Shafer, Hyper Talk Programming.

How Is All This Implemented?

Objects are intrinsically related to classes. Think of a rolodex with printed sections for name, address, and phone numbers. Every time you fill one out, you create an object. The format of the rolodex card is the class. So then, whenever you fill out a rolodex card, you are creating an instance of the rolodex card class. The way that the format of the rolodex card is presented to an operating system is known as a data structure. Objects (and classes) are implemented as data structures. Data structures are tables of data including structural relationships. So a UI object, with its moniker, attributes, and hints would be a single data structure in the form of its class.

The GEOS Process of Application Design

Introduction

Object oriented programming is not a new concept. Neither is the idea of using objects to represent user interface components. What is novel is the way of using objects as UI components such that the GEOS operating system can interpret what those components are intended to do. Then GEOS can create the actual, visual and behavioral application UI to be a good interpretation of any number of style guides.

The GEOS process changes the process of designing an application's user interface. The user interface designer weighs the human/computer interaction design considerations against application input/output requirements and creates a generic user interface description (in the form of objects with attributes and hints). The GEOS operating system uses its specific user interface software and automated style guide interpreter to read the generic description and produce on-screen representations adhering to any particular specific user interface style guide. The GEOS system accomplishes this task through a two step process.

Firstly, the application developer defines his program's user interface using UI objects with special properties that allow him to express the user interface needs of his application.

Secondly, the GEOS system reads the description, interprets it, and produces a realization of the program user interface which visually and behaviorally conforms to the explicit and implicit guidelines of a particular style guide. Because this interpretation is done at runtime, the user may switch specific user interfaces (e.g. Motif to Openlook) at any time.

The Automated Style Guide

The GEOS process shortens and streamlines the application development process by removing the step in which the user interface is designed to fit a particular style guide. The GEOS system provides what is essentially an auto style guide. Appendix E explains the role of a style guide. Details and nuances of each specific user interface are implemented by the GEOS system. The application simply defines its user interface using a generic model. This generic model, in essence, decouples the application from its user interface. The application developer specifies the application's user interface in terms of common semantic properties, rather than specifics of the particular user interface gadgets.

As a result, the system can support a scalable environment and several GUI specifications with the same application code. Under the generic model, the developer specifies the application's user interface in terms of abstract (generic) objects, common semantic properties, and guiding hints, rather than specific user interface gadgets. These generic objects are placed in a hierarchy to demonstrate their relative importance and interdependencies.

Once the application's user interface is described in generic terms, the GEOS system maps each generic UI object to one or more specific UI objects, depending on which specific user interface is chosen. For example, an application's UI file might specify that a list of options be presented to the user. Depending on the attributes and "hints" of the generic object, this might be implemented as a submenu in OpenLook or as a dialog box in OSF/Motif TM. The conversion from generic to specific user interface is transparent to the application. The GEOS system can accommodate any number of specific user interface libraries.

In this manner, the GEOS system makes sure that the end result of the specific user interface transformation conforms with its corresponding style guide. This is an important step. Style guides, as explained before, provide guidelines and specifications for application designers to follow when they design their program's user interface. Given a particular set of human-to-computer interaction needs, it defines which specific UI components to use. Sometimes style guides are very specific: for example, OpenLook specifies that main controls are to be organized in a series of button menus and most style guides ask that menu items end in an ellipses ( . . . ) if the user will be asked for more information before the operation is carried out. Sometimes style guides are very general: for example, there is a certain safe guide which is not clear on, given a dialog box used to set properties, whether to supply OK, Reset, Cancel, and Help buttons or Apply, Reset, Close, and Help buttons. So, due to the complexities and nuances inherent in the process of designing the specifics of an application's user interface, developers may be forced to spend significant time and resources tweaking their designs. With the GEOS system, this step is automated and relatively painless.

This method of implementing the user interface provides benefits for developer and user alike. The user can purchase one application—a word processor, for instance. Then, depending on his personal preference, he may run the program with a Motif, OpenLook, or NewWave user interface. If his son wants to type a quick letter, he can switch to a user interface designed for novices, for example.

The developer saves untold time and resources which would have been spent designing, thinking about, and redesigning the user interface for his program. And just for one specific style guide. With the GEOS system, one application runs under different style guides (we refer to the implementation of a particular style guide as a "specific user interface.") and different levels of complexity (which is really just another style guide).

Defining an Application's User Interface

An application defines its user interface using generic UI classes.

Generic User Interface Classes

Generic UI classes are abstract types of user interface components. By thoroughly researching and analyzing existing and proposed GUIs, GeoWorks identified the major kinds of user interface components that were common. Abstracting these components—reducing them to their functional essence resulted in ten generic UI classes. For example, all specific UIs need a method of initiating an action hence the generic trigger class. A list of the major generic UI classes follows:

GenApplication, manages the various top-level windows of an application

GenPrimary, provides the main window for an application, grouping and managing all of the i controls and output areas for the application GenTrigger, represents a pushbutton that initiates a certain action when triggered by the user GenSummons, elicits responses from the user, typically several at a time GenInteraction, serves as a generic grouping object (group of controls, non-modal dialog box, menu, or sub-menu)

GenRange, allows the user to interactively set a value within a discrete range of values GenList, groups multiple selection items (to set options, and so on)

GenView, provides an area of the screen on which a document may be shown

GenDisplay, displays and manages one or more secondary windows

GenTextEdit and GenTextDisplay, provides text fields with differently formatted text, keyboard navigation, cut and paste, and other editing functionality

Generic User Interface Objects

Figure 12:
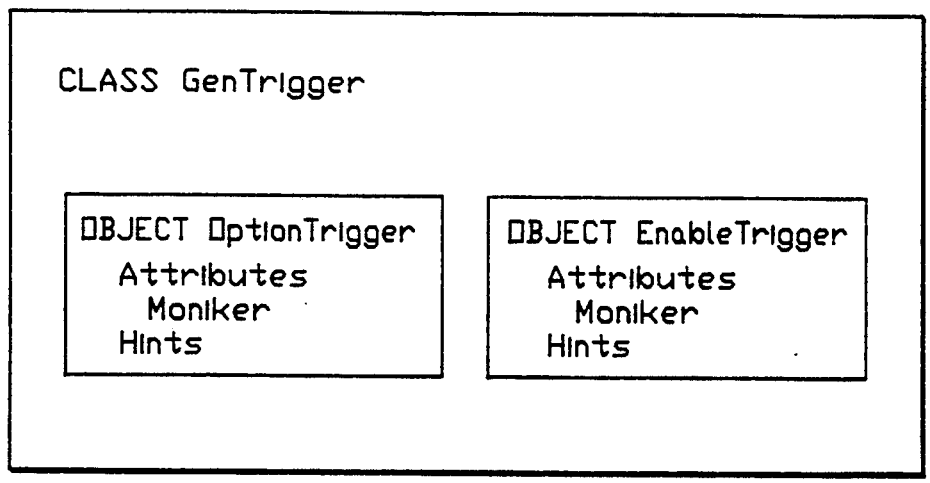
FIG. 12 illustrates a GenTrigger class of generic user interface object and two objects in that class.

Generic UI objects are instances—specific incarnations—of generic UI classes. FIG. 12 illustrates two instances, the options trigger and the enable trigger, of the GenTrigger class. When an application needs a particular UI component (a button, for instance) it chooses the appropriate generic class (GenTrigger) and asks the GEOS system to create an instance of that class. The application can then use the resulting generic UI object as part of its user interface. Each individual UI object has its own instance data whose scope is determined by the UI class. There are two kinds of instance data: attributes and hints.

User Interface Components

When an application needs a particular UI component (a button, for instance) it defines a generic UI object that represents the functionality inherent in the type of component desired. The GEOS system provides different types of generic UI objects which determine the general category of functionality wanted. Special properties of that object are set to convey more detailed as well as vague information about the human/computer interaction design considerations and application input/output requirements.

Basically, these generic UI objects are data structures with two different types of instance data—attributes and hints.

Attributes

Attributes define the behavior and/or appearance of a UI object in a very specific manner: an attribute is either on or off, and there is a definite set of attributes associated with every UI object class. When an application sets an attribute, it can be sure that the specific UI component that the GEOS system selects exhibits the desired behavior.

For example, setting the modal attribute for a dialog box ensures that the user must respond to it before continuing. Setting the disabled attribute for a trigger dims the trigger's label (called a moniker) and does not allow the user to select it.

Monikers

A moniker is a special attribute every UI object has. Each UI object may be given a moniker, or visual representation, though a moniker does need to be defined for every object. It could be the name of a button or the icon to be displayed when a window is minimized. A UI object is not restricted to a single moniker: a list of monikers may be defined. Depending on the situation and context, the GEOS system uses one of the monikers. For example, an application may define different icons for CGA, EGA, and VGA monitors to optimize the its appearance. The GEOS system displays the proper one for a particular user's set up. Some UI objects may have several textual and pictorial monikers. GEOS chooses the appropriate moniker.

Hints

Hints provide additional information about the UI object in question. An application's needs are not always absolute and may be interpreted differently (even ignored) by different specific UIs. Some visual and behavior aspects of UI objects should not be implemented as attributes because of this. In other words, there are some UI components or functionality which is not universal to all specific UIs. Those capabilities cannot be attributes, since not all specific UIs support them. Therefore, they become hints. When the developer assigns hints to a particular UI object, he cannot be certain that the hint will be implemented by any one specific UI.

There are two types of hints: command and declarative.

Command Hints

Command hints are direct requests for a specific implementation of a UI component. A developer would choose to use a command hint when he had a specific UI component style in mind. For example, an application may explicitly ask for a scrolling list (HINT_SCROLL_LIST) or check boxes (HINT_CHECKBOXES). Not all specific UIs offer the capability to follow command hints. For instance, some specific UIs allow the user to use the keyboard to navigate menus and dialog boxes. To support this, certain UI objects would contain several HINT_NAVIGATION_ID and HINT_NAVIGATION_NEXT_ID hints. For example Motif might make use of this hint, but Open-Look might ignore it because the style guide does not allow such navigation. The GEOS system fulfills a particular command hint in any specific user interface that supports it.

Declarative Hints

Declarative hints are more vague; without referring specifically to a particular implementation, they give an indication of the functionality of the UI object in question. For example, a generic UI object containing a list of possible actions may have a HINT_MENUABLE, indicating that the developer envisions the list being presented in a menu. However, perhaps a specific UI designed for novice users states that a menu is too complex. Then the GEOS system implements the list of actions as a simple series of large, plainly visible buttons. Or, similarly, an option in that menu may have hints stating that it is advanced, infrequently used, and potentially dangerous. Then a novice specific UI would remove the trigger altogether.

Once again, declarative hints may or may not be implemented by a particular specific UI. For instance, CUA does not allow submenus in the menu bar. A GenInteraction object with the hint HINT_MENUABLE that is inside of another GenInteraction object with the hint HINTMENUABLE would be implemented as a submenu in OpenLook or Motif. However, in CUA, it would be added to the menu and set apart by separators, since submenus are illegal according to the style guide.

Using Generic UI Objects

Figure 13:
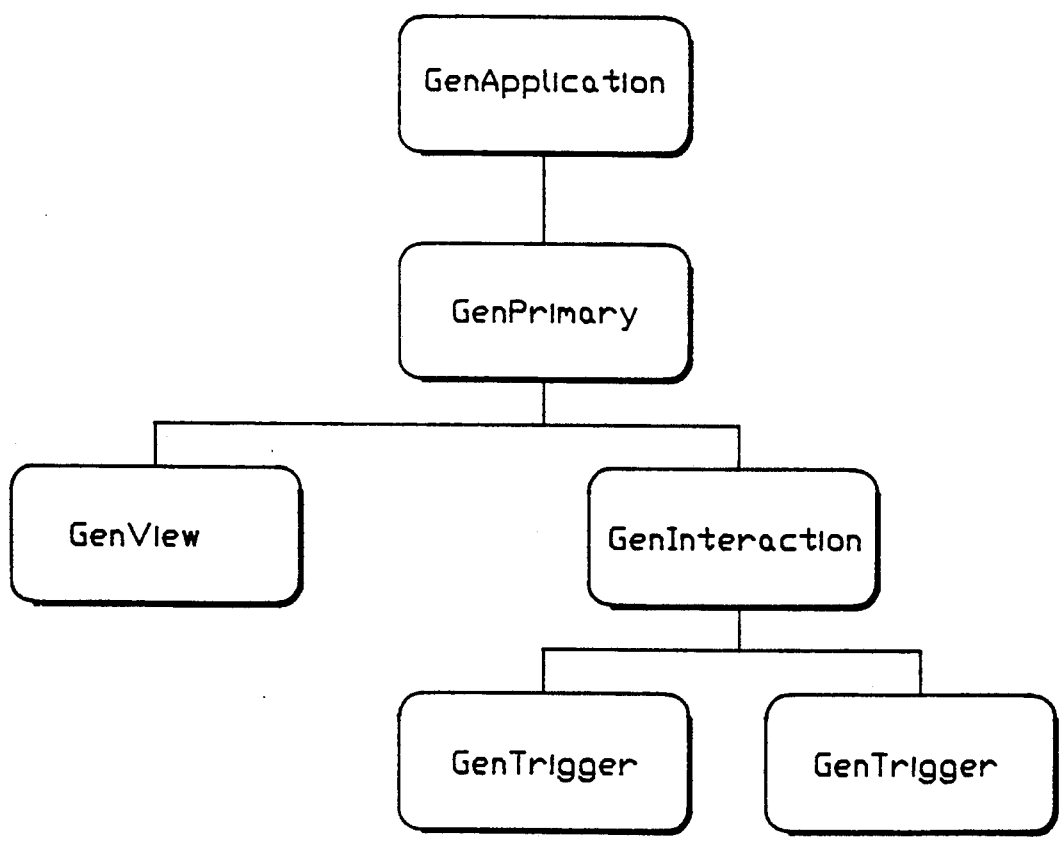
FIG. 13 illustrates a sample generic user interface tree.

The generic UI objects an application chooses to represent the UI components it needs are arranged into a tree. This tree is a hierarchy of UI objects, to convey the relative importance and interdependencies of each object. This provides an indication of which components ought to be in plain view and which can be hidden one or more layers deep. The illustrative drawings of FIG. 13 show an example of such a generic UI tree. A description of the generic UI tree of FIG. 13 is provided in Appendix A. Appendices A-E are expressly incorporated herein by this reference.

Given a generic user interface description such as the one in FIG. 13, the GEOS system can implement it in a number of different specific user interfaces. It automatically sizes menus, fields, and boxes; it places buttons, scroll bars, and text—all the while adhering to the specific user interface style guide. The illustrative drawing of FIG. 14 shows how this particular generic UI specification might be realized by GEOS for Motif. Note that GenApplication has no visual representation.

Decorations

Decorations are additional specific user interface components that the developer does not request, but that the GEOS system provides in order to maintain a good implementation of a particular style guide. For example, note that in the sample application above, GEOS adds the buttons in the upper corners, a resizing border, and a "pin" option in the menu. These are all accoutrements which the Motif style guide, for example, states should exist and function in a certain manner. The developer does not need to worry about remembering them or asking for them, since they may be different for Open Look or New Wave, for example. This is another example of how the GEOS system ensures a good interpretation of style guide without needing explicit direction from the programmer.

Specific User Interfaces

Specific user interfaces are implemented as libraries. Much like a group of students can go to the public library and all share an encyclopedia, programs can share library modules. Libraries are modules of executable code which are dynamically loaded into memory when needed by one or more applications. Only one copy of a library module is loaded at a time and is shared by all executing applications. Specific UI libraries are responsible for interpreting the generic UI description and implementing the actual application's user interface.

Programming Examples

To ground out the above concepts, let's compare designing a simple user interface the conventional way versus the GEOS way. We will not worry about the underlying application functionality. We shall create a simple user interface in two different specific exemplary user interfaces (Macintosh and OS/2 Presentation Manager). We will end up with two separate executable applications. Then we shall do the same in accordance with the GEOS process, and show how the resulting single executable application can be displayed in any number of specific user interfaces.

Macintosh Example

Let's create a simple user interface on an Apple Macintosh—a single window with a File menu containing five commands, New, Open, Save, Save As, and Quit.

Macintosh applications make use of many resources, such as menus, fonts, dialog boxes, and icons, which are stored in resource files. For example, an icon resides in a resource file as a 32-by-32 bit image, and a font as a large bit image containing the characters of the font. In some cases the resource consists of descriptive information (such as, for a menu, the menu title, the text of each command in the menu, whether the command is checked with a check mark, and so on). The resources used by an application are created and changed separately from the application's code. This separation is the main advantage to having resource files. A change in the title of a menu, for example, will not require any recompilation of code, nor will translation to another language. The preceding together with the following description and code fragments are from, Inside Macintosh, Volume 1.

So, to create the sample application, the programmer would first make use of graphical, interactive development tools on the Macintosh to define the menu and its contents. He would first create a new menu resource. Then he would add commands to the menu (New, Open, Save, Save As, and Quit). Finally, he sets the attributes of the menu and its choices (e.g. no checkmarks, separators between Save As and Quit, etc.). Below is a complete list of all the resources he would define:

- Menu (resource ID #128)-menu with the apple symbol as its title and no commands in it
- Menu (resource ID #129)-file menu with commands New, Open . . . , Save, Save As . . . , and Quit commands
- Window template ( resource ID #128)—document window without a size box; top left corner of (50,40) on coordinate plane, bottom right corner of (300,450); title "Sample"; no close box Each menu resource also contains a "menu ID" that's used to identify the menu when the user chooses a command from it; for all three menus, this ID is the same as the resource ID.

Excerpts of code to initialize and display these resources are provided in Appendix B.

The code in Appendix B and the resource file would result in the on-screen shown in FIG. 15.

Note that the code required to create this particular on-screen representation is very specific to the Macintosh. For instance, if you would like to make the application's appearance and behavior conform to the CUA (Sort Presentation Manager) style guide, everything would have to be rewritten.

OS/2 Presentation Manager Example

Let's create the same user interface in OS/2 Presentation Manager. OS/2's style guide (CUA) and operating system are quite different than Apple's, so user interface designs need to be altered and code needs to be completely rewritten.

To create an application's user interface in OS/2 Presentation Manager, the code describing the user interface is partially imbedded in the actual program code. To display standard window with a simple menu, the designer would include the lines shown in Appendix C in his main program file (e.g. SAMPLE.C). The code fragments in Appendix C are from Programming the OS/2 Presentation Manager by Charles Petzold.

Figure 16:
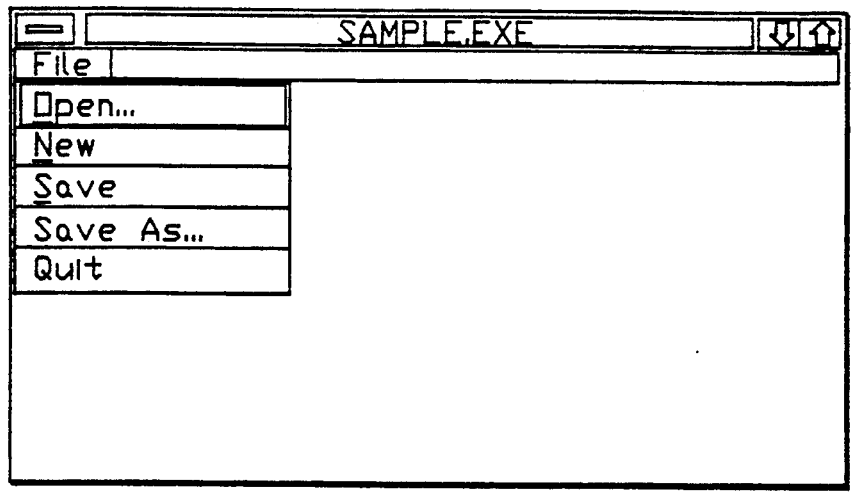
FIG. 16 illustrates a sample user interface screen of a prior art OS/2 application.

The code and resource files of Appendix C are compiled and the resulting on-screen representation of the application would look similar to the representation of FIG. 16.

Notice that when developing in either OS/2 Presentation Manager or Apple Macintosh, the programmer defines specific user interface components with specific attributes. Then the program code accesses them and the operating system draws them on the screen. The actual mechanics of programming and development in these two environments are very different.

In Presentation Manager, menus and menu-related attributes are defined in a textual resource file. Attributes of windows and other UI components are defined via routine calls. Options are passed as parameters.

On the Macintosh, UI components are contained in separate resource files. Thus, their attributes, are defined using a resource editor application. This application supplies graphical templates which the programmer uses to create and edit resources. For example, the programmer formats dialog boxes in the editor, manually sizing the border, adding text blocks, setting text styles, placing buttons, and so forth.

GEOS Example

In the GEOS process, the programmer defines the user interface needs of his application with generic UI objects. These objects have attributes, as do the OS/2 or Macintosh objects, but these attributes are only those that represent an aspect of apace or behavior which is common to all specific UIs. Peculiarities of different specific UI implementations are accommodated through the use of hints.

Appendix D provides a sample user interface description file.

User Interaction

Perhaps the most vital aspect of computer use is user interaction with the computer, for what use are hundreds of features and a clear and concise user interface, if the user cannot easily make use of them? Most graphically oriented systems make use of a device called a mouse. The user slides the palm-sized object around on his desk, and a pointer on the screen moves in accordance. A mouse may have one to three buttons. Moving the pointer around the screen, the user can click on buttons, resize windows, and draw circles. However, just as nearly every specific user interface has a style guide describing visual and behavioral aspects of the system, nearly every specific user interface style guide defines user interaction conventions. There are so many ways that a user could possibly click and drag and double click the left button and triple click the right button and so on that these conventions are necessary.

So, once again, Geoworks identified a problem. Conventional applications generally handle their own user interaction. For example, referring to FIG. 17, if the user double clicks on any letter in a word, the application selects the entire word because that is what its style guide says to do. Notice that we have a parallel without our earlier dilemma—different style guides have different ways of handling user input. How can an application be truly specific user interface independent if it has to worry about different types of user input? The answer according to the present invention is to abstract user interaction as well.

Figures 17, 18:
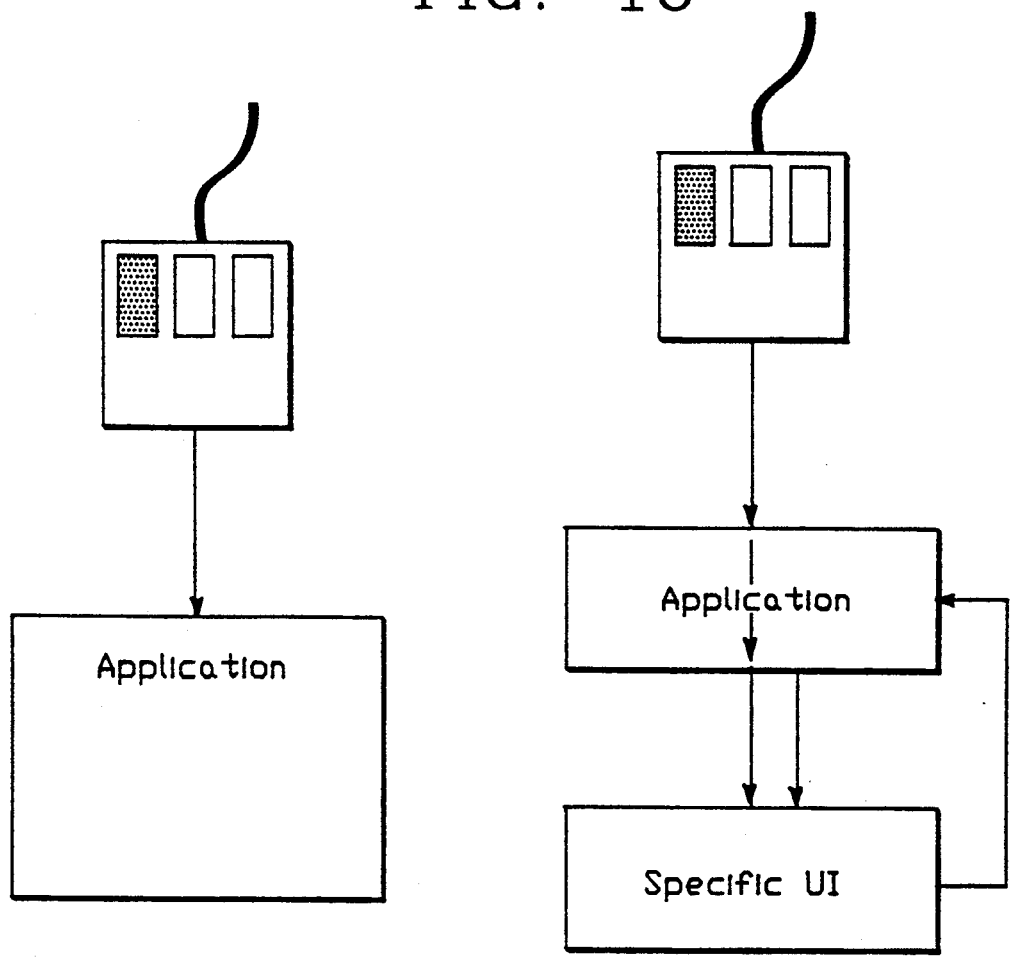
FIG. 17 illustrates a conventional user interaction.
FIG. 18 illustrates a user interaction according to the present invention.

Let's follow how user interaction works in the GEOS system with reference to FIG. 18. First, the application receives user input. For instance, the user double clicks while using a word processor under Motif. Then, the application determines the context of the user input. For instance, the user clicked on the second word in a word processing document. Next, the application passes this information, the actual input and the context, to the appropriate specific UI interpreter. Finally, the UI interpreter, given the context and the raw input, tells the application exactly what to do. For example, it tells the word processor to select the targeted word.

Conventional Development

There are two major problems with conventional user interface development: the time involved and the potential for difficult to use application user interfaces.

Time

The current state-the-art operating systems offer a variety of tools and utilities to make the developer's life easier. However, no matter whether the program's environment is the NeXT computer or Microsoft Windows for the PC, for example, the developer still has to manually lay out every user interface component. He chooses the window style. He places the menu items. He adds buttons and dialog boxes. He carefully places list of options and text fields in those dialog boxes, perhaps moving them around a pixel (a single dot on the screen) at time. He defines the exact sizes and locations of every user interface component. Then he steps back and makes sure that the resulting interface still adheres to the style guide set forth for his environment. He tweaks the design some more, steps back, and tweaks it some more. Finally, when the user interface design is finally completed, the programming team write the rest of the program. Generally, at least 30 percent of development time is spent designing and implementing the user interface.

It is a time-consuming task to redesign the user interface (that took so long to complete) of an application for other environments. In some environments it is easier than others. But in all of them, the designer is constantly adjusting and worrying about making the result conform with the style guide. And that can require much time and hard hard work. Modifying it to adhere to another style guide can also take much time and hard work.

Differences in the Quality of UIS

Figure 19:
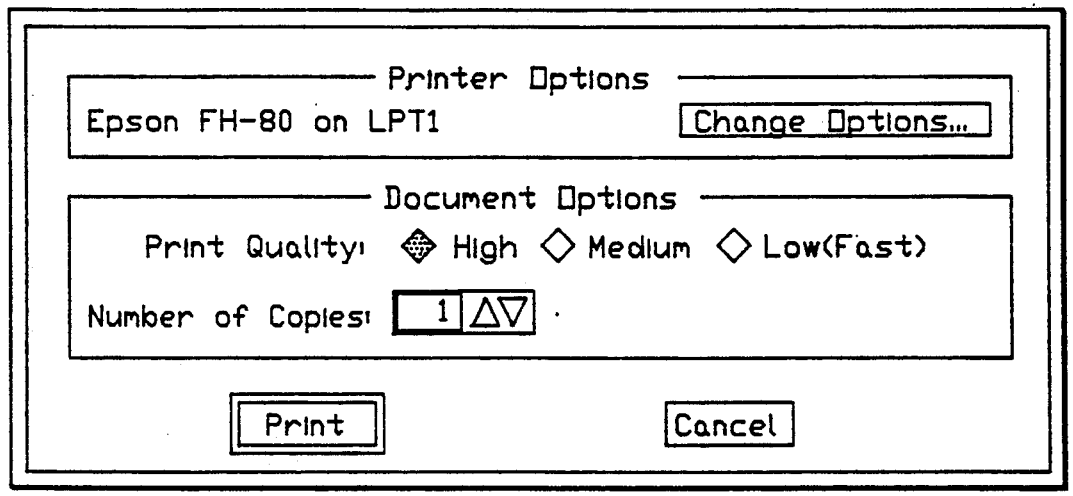
FIG. 19 illustrates an easy to use layout for print dialogue box that can be more difficult to use.

There are many very good applications with intuitive and logical user interfaces. There are also a lot of very powerful applications with user interfaces that are not as intuitively easy to use. When the developers are solely responsible for making sure that their applications correspond with the goals and objectives set forth in a style guide, there are bound to be some odd interpretations. Given a stack of wood and power tools, a master carpenter could build a beautiful and priceless bird house. A less skillful craftsman might build a worthless doorstop. Similarly, given the tools for creating a user interface, programmers could very easily create less than optimal user interfaces. For example, examine the case of a dialog box summoned when a user selects the print command. There are many, many different ways that an application could handle this situation. Some are satisfactory, some are excellent, and others are less than optimum. For instance, FIG. 19 shows a good layout for the print dialog box. The dialog box design of FIG. 19 is good for several reasons. Firstly, it visually groups options into logical groups with sensible titles—Printer Options and Document Options. The setting of which printer is connected is not one which the user frequently changes. Therefore, the options related to this are not even accessed through this dialog box. Clicking Change Options . . . brings up a separate dialog box. The Document Options have descriptive, obvious names—high, medium, and low print quality. Print and Cancel give an good indication of what the buttons will do. Additionally, the extra box around Print indicates a default action, good for experienced users as well as novices unsure of what to do next.

Figure 20:
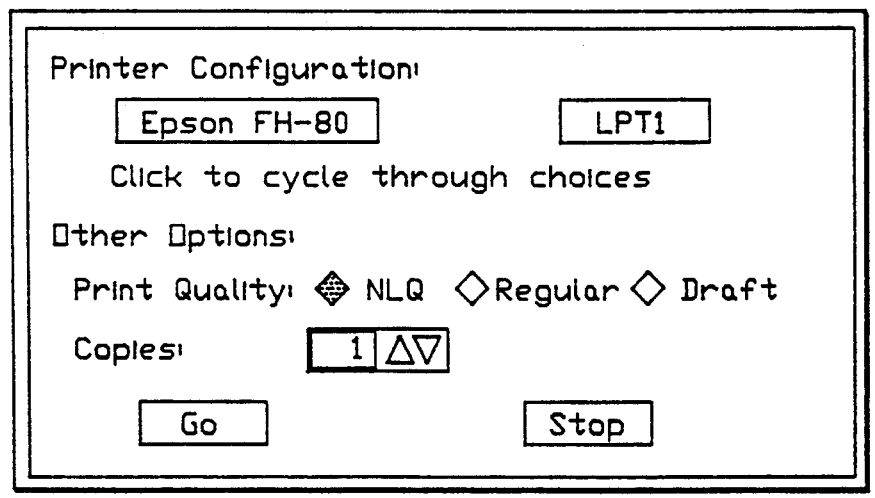
FIG. 20 illustrates a poor layout for print dialogue box.

In contrast, the dialog box of FIG. 20 is can be a challenge to use. The options are not obviously grouped into logical divisions. The title Other Options is somewhat vague. "Configuration" is a technical term. Printer Configuration options are not often accessed, and possibly should not be here, for example. Clicking to cycle through the choices is not an intuitive or friendly way to accomplish the task-it doesn't plainly show the user all the possible choices, and if the user passes the proper setting, he will have to keep clicking to get back to it. Print Quality options use is unclear; technical terms—NLQ, regular, and draft. What does mean? Is regular latter looking than NLQ? Go and Stop buttons are unclear as to their function. There is no default action.

And on top of it all, once the developers have created a good interface for their application and spent lots of time and money doing it, they still have to create an entirely view executable program to run in a different environment under a different specific UI.

Scalable User Interface

The scalable user interface can be thought of as just another style guide. It is simply a style guide designed with the user's computer proficiency very much in mind. For example, for novices, the style guide would state that the user should be able to plainly see all his options. Thus, hidden menus (pulldown or pop up) would not be allowed. Scrolling views are also undesirable because of their complexity. Visible methods of getting help need to be evident at all times. Thus, an automated style guide can run an application with its normal style guide (such as Motif or Open look), or switch to one designed for novices. Conceptually and to the application developer, it's just the same as switching between two very similar "professional" specific user interfaces. To the user, it's like getting several programs for the price of one.

Operation

Referring to FIG. 21, there is shown a diagram illustrating the dynamic interaction of the constituent elements of the invention. The elements of FIG. 21 all are implemented in computer software. The Application software interacts with the operating system software. The operating system software includes the Generic User Interface Object Library and Controller (GUIOLC), multiple specific UI Interpreters (SUIIs) (only one shown), and multiple specific UI Toolbox and Controllers (SUITC) (only one shown), and their respective driver software modules (only one set of driver software modules shown).

Application Data is operated upon by the Application Software. A Generic UI Specification (GUIS), which is associated with the Application, is operated upon by the GUIOLC. Specific UI Application Interface Data is operated upon by the SUITC.

Multiple Applications can run simultaneously. Each Application corresponds to a particular GUIS. It is possible to have multiple GUISs, that is, different GUISs for the different Applications.

The GUIOLC and the SUII serve to map Input/Output (I/O) requirements of an Application to the SUITC under which the Application is to be presented to the user. In the present embodiment, the GUIOLC provides a series of generic UI object classes (e.g., GenApplication, GenPrimary, GenTrigger, etc. . . .). These generic UI classes act as an interface between the Application and the portion of the operating system software that controls the representation of a specific user interface for the Application. For example, when the Application needs to represent a UI component used to initiate a certain user action, it specifies the GenTrigger generic user interface object. From the standpoint of the Application, the steps required to represent a component for initiating user interaction merely involves specifying the GenTrigger object. As explained below, the operating system software, in accordance with the invention, handles the details of actually selecting, arranging and otherwise managing the gadgets used to represent the component.

Once the Application has specified a particular generic user interface object, a selected SUII uses the specified object and instance data for that object to interpret the manner in which the specified object is to be represented. In particular, the selected SUII selects gadgets from a corresponding SUITC and arranges the gadgets in accordance with attributes and hints in the instance data for the specified object.

Each Application can have a different GUIS associated with it. Thus, while two applications might specify the same generic UI object, the different GUISs associated with the different Applications can result in different representations (visual or behavioral) for the same generic UI object. This is because different GUISs can have different instance data.

In the present invention, the Operating System Software, rather than the application, indicates the specific UI under which the Application is run. Thus, for example, if there are four possible specific UIs (with four corresponding SUISs and four corresponding SUITCs) then the system software determines which of the four is to be used by the Application (and which of the four SUIIs and SUITCs). However, it is possible for the application itself to indicate which of the four (or more) specific UIs is to be used by the Application.

FIGS. 23-26 illustrate how the same generic UI object and the GUIS for a particular Application can result in different visual representations when different specific UIs are designated. In FIG. 23, a GenDocumentControl object and the instance data from an Application GUIS is shown. FIG. 24 shows a possible NewWave interpretation of the object of FIG. 23. FIG. 25 shows a possible OpenLook interpretation of the object of FIG. 23. FIG. 26 shows a possible Motiff interpretation of the object of FIG. 23.

FIGS. 27-30 further represent how the same generic UI object and a GUIS for a particular Application can result in different visual representations when different specific UIs are designated. FIGS. 28-30 respectively represent possible NewWave, OpenLook and Motiff interpretations of the object of FIG. 27.

FIG. 31 illustrates the operation of a representative SUII for a GenList object under an OpenLook User interface. Possible gadget choices available from the corresponding OpenLook SUITC are indicated in the left column. The representation and arrangement of the gadgets in accordance with this SUII is indicated in the center column. The decision method used to determine which gadget choice to make is indicated in the right column.

Thus, the representative interpreter selects which gadgets (left column) and their arrangement (center column) based upon predetermined criteria (right column). The information used to test the criteria is found in the instance data of the GUIS for the designated GenList object.

It should be noted that, for example, one Application may specify certain instance data in its GUIS for the GenList object, and another Application might specify different instance data in its GUIS for the GenList object. The operating system using the exemplary SUII of FIG. 31, therefore, could represent a GenList object differently for the two Applications due to their different GUISs.

FIG. 32 illustrates the operation of another exemplary SUII. The interpreter of FIG. 32 is hypothetical for a GenList object. The left column represents possible gadgets from the hypothetical SUITC (not shown). The center column represents their arrangements under this interpreter. The right column illustrates the criteria used to select the gadgets.

From FIGS. 31 and 32, it should be appreciated that even the same generic UI object (e.g. GenList) using the same instance data from the same GUIS can result in a different UI representation when a different specific UI is selected. For example, in FIG. 31, the specific UI is OpenLook, and in FIG. 32, the specific UI is a hypothetical UI.

FIG. 33 shows a further representation of a generic user interface object (GenList) and its instance data and two possible interpretations of it, one under a hypothetical UI, and the other under an OpenLook UI.

Figure 34:
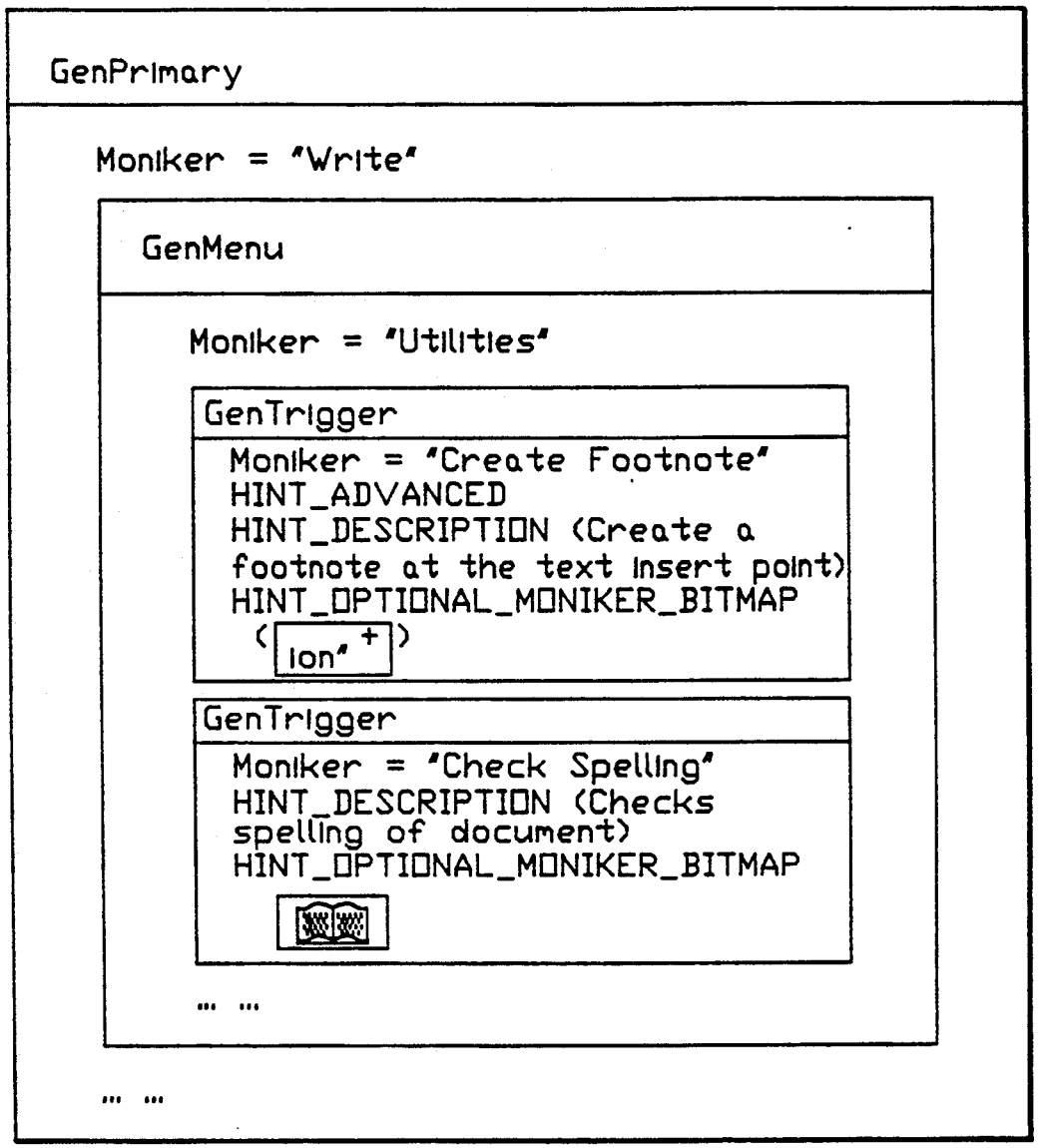
FIG. 34 illustrates a sample generic user interface specification.
Figure 37:
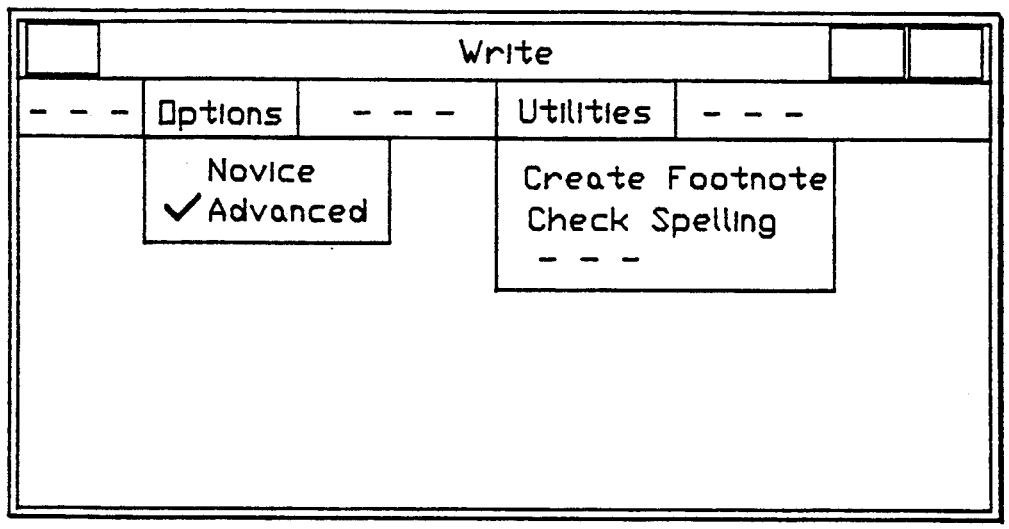
FIG. 37 illustrates an interpretation of an object having the specification of FIG. 34 under a hypothetical user interface of the future in an advanced mode.
Figure 38:
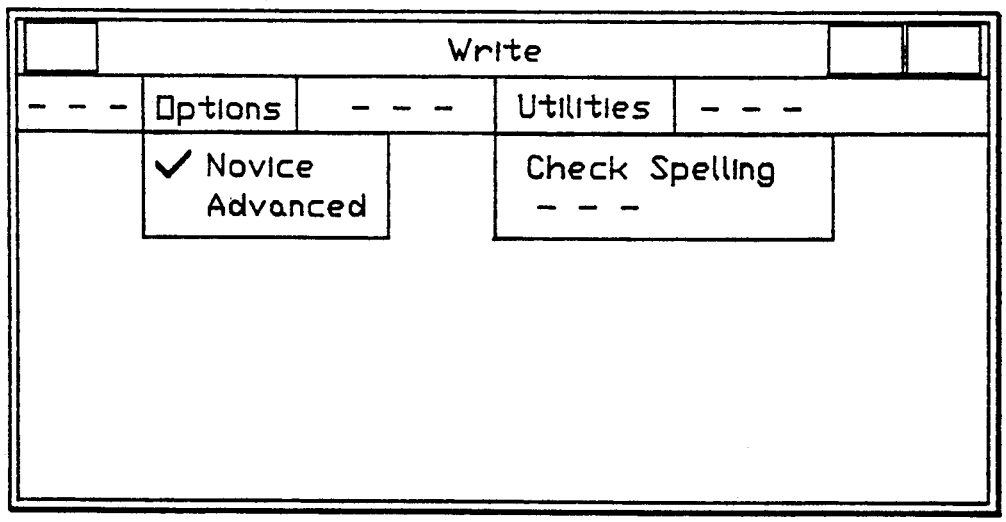
FIG. 38 illustrates an interpretation of an object having the specification of FIG. 34 under a hypothetical user interface of a future in a novice mode.

FIG. 34 shows a representative hierarchy of generic UI objects and their respective instance data. FIG. 35 shows possible Motiff and OpenLook interpretations. FIG. 36 shows a possible hypothetical graphical UI interpretation. FIGS. 37 and 38 respectively show possible hypothetical interpretations under advanced and novice modes.

FIG. 43 provides a dynamic block diagram which represents interpretation of user interaction by an operating system in accordance with the present invention. A user provides an input such as a double click mouse command on text. The Application passes the user input command information (double click) and the context information (over text) to a specific UI interpreter. The SUII interprets the input information and indicates its meaning to the Application. The Application then can request the operating system to perform a function consistent with the input (e.g., select a targeted word).

It will be understood that different specific UIs can interpret the same input differently. Moreover, the different interpretations can depend not only upon the nature of the command but also upon the context in which the command is provided. The SUII shields the Application from the details of user input interpretation. Of course, as explained above, there may be multiple specific UIs supported by the operating system. As explained above, the different SUIIs for the different specific UIs may interpret the user input (command plus context) differently.

Referring to FIG. 41, there is provided a dynamic block diagram which provides a generalized representation of the operation of an object oriented system. The present invention is implemented as an object oriented system, although it could be implemented as a procedural system (FIG. 39).

In the presently preferred embodiment, each generic UI object represents a class. The GUIS for an Application provides instance data for the generic UI object class members. The multiple SUIIs include messages that point to methods for operating on the instance data.

Thus, for example, when an Application is running under a first specific UI, the generic UI object points to the SUII for the first specific UI, and the messages and methods of that first SUII operate on the instance data of the generic UI object. If, on the other hand, an Application is running under a second specific UI, the generic UI points to the SUII for the second specific UI, and the messages and methods of the second SUII operate on the instance data of the generic UI object.

It will be appreciated, for example, that an Application and an SUII can communicate through a generic UI object. For example, referring to FIG. 31, the Application may specify the generic UI object GenList and communicate the message, delete "tomato". The GenList object, running under the OpenLook specific UI, for example, sends the message to the OpenLook SUII. The OpenLook SUII uses the message to identify a method that results in removal of the "tomato" moniker from the UI representation.

Style Guides

Style guides are documents intended to promote both visual and operational consistency across the set of applications running in a particular environment. To achieve this goal, design rules describe the user interface and design approach in detail. However, it is impossible to anticipate all situations. So that consistent extensions can be made, portions of the document attempt to explain the rationale behind the rules, and the intended "feel" of the applications in question. These design rules are provided in pursuit of integration and consistency. Application programmers are asked to commit themselves to following the design rules because of the importance of a cohesive, consistent set of applications. See, for example, HP NewWave Environment: User Interface Design Rules.

For example, the following is an excerpt from *Open Look Graphical User Interface Application Style Guidelines*. It describes behavioral and visual guidelines for scroll bars (which allow the user to view portions of a large document at a time by "scrolling" up and down and left and right).

"Scrolling with Scrollbars: This section describes information you need to specify for your application when you provide scrollbars for a scrollable text region . . . "

"Scrolling Objects of Unknown Size: In some situations, it is impossible to determine the size of the object being viewed. For example, the result of a database query might be read in only as needed. Such situations call for a slight modification of the usual scrollbar behavior.

When the size of the entire object is not known, make the length of the proportion indicator represent the length of the part of the object that is known at any given point."

"If users scroll to the end of the cable—either by dragging the elevator or by clicking on the end cable anchor—scroll the view to the end of the data that has already been read in. To leave the elevator at the very end would be misleading, because the view is not at the end of all the data.

When the elevator is not at the end of the data, bump the elevator a few pixels upward from the bottom cable anchor to show that the view is not at the true end of the data. Put a message in the footer of the window to inform users about what is happening.

When users drag the elevator again or click on the down (or right) arrow, interpret that action as a signal that users want to read in the next portion of the data."

"Once the new data is read in, the scrollable object is larger, and you will need to adjust the position of the elevator accordingly."

Releasing the application developer from having to deal with pages and pages of this is what the patent is all about.

While a particular embodiment of the invention is shown and described, it will be appreciated that the present system can be implemented differently without departing from the invention. For example, as illustrated in FIG. 39, the invention can be implemented as a procedural system rather than as an object oriented system. Moreover, for example, in the present embodiment, the GUIOLC and the multiple SUIIs are separate modules. The GUIOLC and the multiple SUIIs can be implemented as a single module without departing from the invention.

Appendix A

```
/* ----------------------------------------------------------------
        Application Object
---------------------------------------------------------------- */

/* This application is in its own resource so that geoManager
 * can load it quickly to grab the icon for the application. */ start   AppResource

SampleApp = GenApplication (
        /* GeoManager uses this token information to store the
         * application's icon in a database. */ tokenChars = "'S','A','M','P'";
        tokenID = "MANUFACTURER_ID_GW"
        children = SamplePrimary;            /* one child */
        active = YodaPrimary;                    /* have window
                                              appear when launched. */

} end AppResource;
```

```
/* ------------------------------------------------------------
       Primary Window
   ------------------------------------------------------------*/ start Interface;       /* This resources holds misc UI objects. */

SamplePrimary = GenPrimary {
       moniker = "Sample Application";
       genStates = default -maximized;   /* Do not open */
       children = SampleView, SampleMenu  /* maximized */
       hints = {
                HINT_NOT_MINIMIZABLE
       }
} end Interface;

/* ------------------------------------------------------------
       UI Objects within Primary Window
   ------------------------------------------------------------*/ start Interface;       /* This resources holds misc UI objects. */

SampleView = GenView {
       viewAttributes = isolatedContents, grabWhilePressed,
                        dragScrollingOn;
       output = process;   /* send exposed method to appl */
       backColorR = BLACK  /* background color */
       horizOpenSize = 256;
       vertOpenSize = 256;
       horizAttributes = scrollable;

vertAttributes = scrollable;
   } end Interface;

/* ------------------------------------------------------------
           Menus
      ------------------------------------------------------------*/ start MenuResource;

SampleMenu = GenInteraction {
          moniker = "Interaction";
          hints = {
                    HINT_MENUABLE      /* all of the children */
                                       /* can be placed in a menu */
          }
          children = MenuItem1, MenuItem2;
   }

MenuItem1 = GenTrigger {
          moniker = "Trigger 1";
   }
```

```
MenuItem2 = GenTrigger {
    moniker = "Trigger 2";
} end MenuResource;
```

Appendix B

```
{The USES clause brings in the units containing the Pascal }
{interfaces. The $U expression tells the compiler what file to look }
{in for the specified unit. }
USES {$U Obj/MemTypes  } MemTypes,   {basic Memory Manager data types}
     {$U Obj/QuickDraw} QuickDraw,   {interface to QuickDraw}
     {$U Obj/OSIntf   } OSIntf,      {interface to the Oper System}
     {$U Obj/ToolIntf } ToolIntf;    {interface to the Toolbox}

CONST appleID = 128;    {resource IDs/menu IDs for Apple, File menu}
      fileID  = 129;

appleM = 1;       {index for each menu in myMenus (array of }
      fileM  = 2;       {menu handles)} menuCount = 2;    {total number of menus} windowID = 128;   {resource ID for application's window} newCommand    = 1; {menu item numbers identifying commands in}
      openCommand   = 2; {File menu}
      saveCommand   = 3;
      saveAsCommand = 4;
      exitCommand   = 6; {skip a number because of separator}

VAR myMenus: ARRAY[1..menuCount] OF MenuHandle;
    { array of handles to the menus }
    wRecord: WindowRecord;    {info about the application window}
    myWindow: WindowPtr;      {pointer to wRecord}

PROCEDURE SetUpMenus;
{ Set up menus and menu bar }

VAR i: INTEGER;

BEGIN
{Read menu descriptions from resource file into memory and store }
{handles in myMenus array }
  myMenus[appleM] := GetMenu(appleID);
    { read Apple menu from resource file }
  AddResMenu(myMenus[appleM],'DRVR');
    { add desk accessory names to Apple menu }
```

```
myMenus[fileM] := GetMenu(fileID);
   { read File menu from resource file }

FOR i:=1 TO menuCount DO InsertMenu(myMenus[i],0); {install menus}
    DrawMenuBar;                          {in menu bar and draw menu bar}

END;  { of SetUpMenus }
- - -

BEGIN   {main program}
{ Initialization }
- - -
InitWindows;          {initialize Window Manager}
InitMenus;            {initialize Menu Manager}
TEInit;               {initialize TextEdit}
InitDialogs(NIL);     {initialize Dialog Manager}
InitCursor;           {call QuickDraw to make cursor an arrow}

SetUpMenus;           {set up menus and menu bar}
- - -
myWindow := GetNewWindow(windowID,@wRecord,POINTER(-1));
   { put up application window }
SetPort(myWindow);
   { call QuickDraw to set current grafPort to this window }
- - -
END.
```

Appendix C

```
- - -
CHAR szClientClass [] = "Sample" ;
HAB  hab ;

int main (void)
     {
        static ULONG flFrameFlags = FCF_TITLEBAR | FCF_SYSMENU |

FCF_SIZEBORDER | FCF_MINMAX |
                          FCF_SHELLPOSITION |
                          FCF_TASKLIST | FCF_MENU ;
HMQ   hmq ;
HWND  hwndFrame, hwndClient ;
QMSG  qmsg ;

hab = WinInitialize (0) ;
hmq = WinCreateMsgQueue (hab,0) ;

WinRegisterClass (hab,            // Anchor block handle
              szClientClass,      // Name of class being
                                  //   registered
              ClientWndProc,      // Window procedure for class
              0L,                 // Class style
              0) ;                // Extra bytes to reserve
```

```
hwndFrame = WinCreateStdWindow (
            HWND_DESKTOP,      // Parent window handle
            WS_VISIBLE,        // Style of frame window
            &flFrameFlags,     // Point to control data
            szClientClass,     // Client window class name
            NULL,              // Title bar text
            0L,                // Style of client window
            NULL,              // Module handle for resources
            ID_RESOURCE,       // ID of resources
            &hwndClient) ;     // Pointer to client window hndl WinSendMsg (hwndFrame, WM_SETICON,
            WinQuerySysPointer (HWND_DESKTOP, SPTR_APPICON,
            FALSE),
            NULL) ;     // Set minimized icon for window
```

This code creates a standard application window with attributes defined by flFrameFlags.

- FCF_TITLEBAR, creates a title bar

- FCF_SYSMENU, creates a system menu

- FCF_SIZE BORDER, creates a sizing border

- FCF_MINMAX, creates a minimize and maximize button

- FCF_SHELLPOSITION, the Presentation Manager (shell) determines the position of the window, typically in a cascaded position from the last application that started

- FCF_TASKLIST, adds the window to the switch list of the Task Manager

- FCF_MENU, creates a menu bar

The menu options are defined in a separate resources file (SAMPLE.RC). Note that the CUA style guide specifies a different order of commands as well as "exit" rather than "quit"

```
/* ---------------------------------
   SAMPLE.RC resource script file
   ---------------------------------*/ include <os2.h>
include "sample.h"

MENU ID_RESOURCE
    {
    SUBMENU "~File",          IDM_FILE
        MENUITEM "~Open...",          IDM_OPEN
        MENUITEM "~New",              IDM_NEW
        MENUITEM SEPARATOR
        MENUITEM "~Save",             IDM_SAVE
        MENUITEM "Save ~As..."        IDM_SAVEAS
        MENUITEM SEPARATOR
        MENUITEM "E~xit",             IDM_EXIT
    }
```

Appendix D

```
#include "generic.uih"

/* ----------------------------------------------------------------
        Application Object
   ----------------------------------------------------------------*/
/* This application is in its own resource so that geoManager }
        children = FileSubMenu,
                ExitGroup;
}

FileSubMenu = GenInteraction {
        children = NewTrigger,
                OpenTrigger,
                SaveTrigger,
                SaveAsTrigger;
        hints = {
                HINT_MENUABLE,          */ can be put in menu */
                HINT_SUB_GROUP          */ add separator */
        }
}

NewTrigger = GenTrigger {
        NEW_TRIGGER_VALUES              */ moniker = 'N', "New"; */
}

OpenTrigger = GenTrigger {
        OPEN_TRIGGER_VALUES             */ moniker = 'O', "Open"; */
        hints = {
                HINT_BRINGS_UP_WINDOW   */ append "..." */
        }
}

SaveTrigger = GenTrigger {
        SAVE_TRIGGER_VALUES             */ moniker = 'S', "Save"; */
}

SaveAsTrigger = GenTrigger {
        SAVEAS_TRIGGER_VALUES           */ moniker = 'A', "Save As"; */
        hints = {
                HINT_BRINGS_UP_WINDOW
        }
}
```

```
FileExit = GenTrigger {
        EXIT_TRIGGER_VALUES     */ kbdAccelerator = specificUI F3; \
                                moniker = 'E', "Exit"; */
}
end MenuResource;
```

What is claimed is:

1. A method for invoking a user interface for use with an application operating in a computer system comprising the steps of:

provided in the computer system a generic object class that corresponds to a class of function performed with the user interface;

specifying in the application instance data in the form of a generic object specification that corresponds to the generic object class, the instance data including attribute criteria, which are criteria that must be met by a specific user interface implementation that is selected using the instance data, and hint criteria, which are criteria that are permitted but not required to be specified in the instance data, and if specified, are permitted but not required to be met by a specific user interface implementation that is selected using the instance data;

providing in the computer system a specific use interface toolbox and controller that operates in the computer system to provide a selection of possible specific user interface implementations for use in performing the class of function; and providing in the computer system an interpreter for the specific user interface toolbox and controller, the interpreter operating in the computer system to select a specific user interface implementation from the selection of possible specific user interface implementations, such that a selected specific user interface implementation satisfies both the attribute criteria and hint criteria specified for the generic object class, except if no specific user interface implementation satisfies both the attribute criteria and hint criteria specified for the generic object class then the interpreter being operable to select another specific user interface implementation that satisfies the attribute criteria but not all of the hint criteria that have been specified for the generic object class.

2. The method of claim 1 wherein said step of providing a generic object class in the computer system includes providing a library of generic objects classes, each respective generic object class in said library representing a respective class of functions.

3. The method of claim 1 wherein:

said step of providing a generic object class in the computer system includes providing in the computer system multiple generic object classes, each of which corresponds to a different class of function performed with the user interface; and said step of specifying instance data includes specifying in the application multiple respective generic object specifications.

4. The method of claim 3 wherein said step of specifying multiple respective generic object specifications includes specifying a tree hierarchy relationship among the multiple respective generic object classes.

5. The method of claim 3 wherein:

said step of specifying multiple respective generic object specifications includes specifying a tree hierarchy relationship among the multiple respective generic object classes; and said tree hierarchy provides an indication of which visual user interface components are to be in plain view and which such visual user interface components are to be hiddend by other such components.

6. The method of claim 1 wherein the generic object class is of a GenListClass that encompasses the generic user interface functionality of selecting from among multiple choices.

7. The method of claim 1 wherein the generic object class is of a GenTriggerClass that encompasses the generic user interface functionality of using a screen image to invoke an action.

8. A method for invoking a user interface for use with an application operating in a computer system comprising the steps of:

providing in the computer system multiple respective generic object classes that respectively correspond to respective classes of function performed with the user interface;

specifying in the application instance data in the form of a generic object specification that corresponds to a designated one of the respective generic object classes provided in the computer system, the instance data including respective attribute criteria, which are criteria that must be met by a specific user interface implementation that is selected using the instance data nd respective hint criteria, which are criteria that are permitted but not required to be specified in the instance data, and if specified, are permitted but not required to be met by a specific user interface implementation that is selected using the instance data; and providing in the computer system a specific user interface toolbox and controller that operates in the computer system to provide a selection of possible specific user interface implementations for use in performing the class of function of the designated generic object class; and providing in the computer system an interpreter that corresponds to the specific user interface toolbox and controller, the interpreter operating in the computer system to select a specific user interface implementation from the selection of possible specific user interface implementations, such that a selected specific user interface implementation satisfies both the respective attribute criteria and the respective hint criteria specified for the designated generic object class, except if no specific user interface implementation satisfies both the respective attribute criteria and the respective hint criteria specified for the designated generic object class then the interpreter being operable to select another specific user interface implementation that satisfies the respective attribute criteria but not all of the hint criteria that have been specified for the designated generic object class.

9. A method for designating a user interface for use with an application operating in a computer system comprising the steps of:

providing in the computer system a first generic object class and a second generic object class wherein each such respective generic object class corresponds to a respective class of function to be performed using the user interface;

specifying in the application first instance data in the form of a first generic object specification that corresponds to the first generic object class, the first instance data including first attribute criteria, which are criteria that must be met by a specific user interface implementation that is selected using the first instance data, and first hint criteria, which are criteria that are permitted but not required to be specified in the first instance data and if specified, are permitted but not required to be met by a specified user interface implementation that is selected using the first instance data;

specifying in the application second instance data in the form of a second generic object specification that corresponds to the second generic object class, the second instance data including second attribute criteria, which are criteria that must be met by a specific user interface implementation that is selected using the second instance data and second hint criteria, which are criteria that are permitted but not required to be specified in the second instance data, and if specified, are permitted but not required to be met by a specific user interface implementation that is selected using the second instance data;

providing in the computer system a specific user interface toolbox and controller that operates in the computer system to provide, for each of the first and second generic object classes, a respective selection of multiple possible specific user interface implementations;

providing in the computer system an interpreter that corresponds to the specific user interface toolbox and controller, the interpreter including a first generic object class interpreter and a second generic object class interpreter;

producing a first specific user interface interpretation for the first generic object class from the specific user interface toolbox and controller using the first generic object class interpreter, such that the first specific user interface interpretation satisfies both the first attribute criteria and the first hint criteria, except if no first specific user interface interpretation satisfies both the first attribute criteria and the first hint criteria, then using the first generic object class interpreter to produce another first specific user interface interpretation that satisfies the first attribute criteria but not all of the first hint criteria that have been specified; and producing a second specific user interface interpretation for the second generic object class from the specific user interface toolbox and controller using the second generic object class interpreter, such that the selected second specific user interface interpretation satisfies both the second attribute criteria and the second hint criteria, except if no second specific user interface interpretation satisfies both the second attribute criteria and the second hint criteria, then using the second generic object interpreter to select another specific user interface interpretation that satisfies the second attribute criteria but not all of the second hint criteria that have been specified.

10. A method for designating a user interface for use with an application operating in a computer system comprising the steps of:

providing in the computer system a generic object class that corresponds to a class of function that is to be performed with the user interface;

specifying in the application instance data that corresponds to the generic object class, the instance data including attribute criteria, which are criteria that must be met by a specific user interface implementation that is selected using the instance data, and hint criteria, which are criteria that are permitted but not required to be specified in the instance data, and if specified, are permitted but not required to be met by a specific user interface implementation that is selected using the instance data;

providing in the computer system a first specific user interface toolbox and controller that is operable in the computer system to provide a first selection of multiple possible first specific user interface implementations for use in performing the class of function;

providing in the computer system a second specific user interface toolbox and controller that is operable in the computer system to provide a second selection of multiple possible second specific user interface implementations for use in performing the class of function;

providing in the computer system a first interpreter that corresponds to the first specific user interface toolbox and controller, the first interpreter operable in the computer system to select a first specific user interface implementation from the first selection of possible first specific user interface implementations, such that a selected first specific user interface implementation from the first selection satisfies both the attribute criteria and the hint criteria specified for the generic object class, except if no first specific user interface implementation from the first selection satisfies both the attribute criteria and hint criteria specified for the generic object class then the first interpreter being operable to select another first specific user interface implementation from the first selection that satisfies the attribute criteria but not all of the hint criteria that have been specified for the generic object class;

providing in the computer system a second interpreter that corresponds to the second specific user interface toolbox and controller, the second interpreter operable in the computer system to select a second specific user interface implementation from the second selection if possible second specific user interface implementations, such that a selected second specific user interface implementation from the second selection satisfies both the attribute criteria and the hint criteria specified for the generic class, except if no second specific user interface implementation from the second selection satisfies both the attribute criteria and hint criteria specified for the generic object class then the second interpreter being operable to select another second specific user interface implementation from the second selection that satisfies the attribute criteria but not all of the hint criteria that have been specified for the generic object class;

selecting one of the first and second specific user interface toolbox and controllers and a corresponding one of the first and second interpreters; and producing one of a first specific user interface implementation and a second specific user interface implementation using the selected controller and the selected interpreter.

11. A method for designating a user interface for use with an application operating in a computer system comprising the steps of:

A. providing in the computer system a first generic object class that corresponds to a first class of function and a second generic object class that corresponds to a second class of function;

B. specifying in the application first instance data in the form of a first generic object specification that corresponds to the first generic object class, the first instance data including attribute criteria, which are criteria that must be met by a specific user interface implementation that is selected using the first instance data, and hint criteria, which are criteria that are permitted but not required to be specified in the first instance data, and if specified, are permitted but not required to be met by a specific user interface implementation that is selected using the first instance data;

C. specifying in the application second instance data in the form of a second generic object specification that corresponds to the second generic object class, the second instance data including attribute criteria, which are criteria that must be met by a specific user interface implementation that is selected using the second instance data, and hint criteria, which are criteria that are permitted but not required to be specified in the second instance data, and if specified, are permitted but not required to be met by a specific user interface implementation that is selected using the second instance data;

D. providing in the computer system a first specific user interface toolbox and controller that is operable in the computer system to provide, for each of the first and second generic object classes, a respective first selection of multiple possible first specific user interface implementations;

E. providing in the computer system a second specific user interface toolbox and controller that is operable in the computer system to provide, for each of the first and second generic object classes, a respective second selection of multiple possible second specific user interface implementations;

F. providing in the computer system a first interpreter that corresponds to the first specific user interface toolbox and controller, i. wherein the first interpreter is operable to select from the first specific user interface toolbox and controller a respective first specific user interface implementation for the first generic object class, such that a selected first specific user interface implementation satisfies both the attribute criteria and hint criteria specified for the respective first generic object class, except if no first specific user interface implementation satisfies both the attribute criteria and hint criteria specified for the first generic object class then the first interpreter being operable to select another first specific user interface implementation from the first selection that satisfies the attribute criteria but not all of the hint criteria that have been specified for the first generic object class, and ii. wherein the first interpreter is operable to select from the first specific user interface toolbox and controller a respective first specific user interface implementation for the second generic object class, such that a selected first user interface implementation satisfies both the attribute criteria and hint criteria specified for the second generic object class, except if no first specific user interface implementation satisfies both the attribute criteria and hint criteria specified for the second generic object class then the first interpreter being operable to select another first specific user interface implementation from the first selection that satisfies the attribute criteria but not all of the hint criteria that have been specified for the second generic object class;

G. providing in the computer system a second interpreter that corresponds to the second specific user interface toolbox and controller, i. wherein second interpreter is operable to select from the second specific user interface toolbox and controller a respective second specific user interface implementation for the first generic object class, such that a selected second specific user interface implementations satisfies both the attribute criteria and hint criteria of the respective first generic object class, except if no second specific user interface implementation satisfies both the attribute criteria and hint criteria of the first generic object class then the second interpreter being operable to select another second specific user interface implementation from the second selection that satisfies the attribute criteria but not all of the hint criteria that have been specified for the first generic object class, and ii. wherein the second interpreter is operable to selected from the second specific user interface toolbox and controller a respective second specific user interface implementation for the second generic object class, such that a selected second user interface implementation satisfies both the attribute criteria and hint criteria of the second generic object class, except if no second specific user interface implementation satisfies both the attribute criteria and hint criteria of the second generic object class then the second interpreter being operable to select another second specific user interface implementation from the second selection that satisfies the attribute criteria but not all of the hint criteria that have been specified for the second generic object class;

H. selecting one of the first and second specific user interface toolbox and controllers;

i. in the event of the selection of the first specific user interface toolbox and controller, using the first interpreter to select respective first specific user interface implementations for the first generic object class and the second generic object class, and ii. in the event of the selection of the second specific user interface toolbox and controller, using the second interpreter to select respective second specific user interface implementations for the first generic object class and the second generic object class.

* * * * *